United States Patent [19]

Barber, Jr. et al.

[11] Patent Number: 5,178,646

[45] Date of Patent: Jan. 12, 1993

[54] COATABLE THERMALLY CURABLE BINDER PRESURSOR SOLUTIONS MODIFIED WITH A REACTIVE DILUENT, ABRASIVE ARTICLES INCORPORATING SAME, AND METHODS OF MAKING SAID ABRASIVE ARTICLES

[75] Inventors: Loren L. Barber, Jr., Lake Elmo; Todd J. Christianson, Oakdale; Jay B. Preston, St. Paul, all of Minn.

[73] Assignee: Minnesota Mining and Manufacturing Company, St. Paul, Minn.

[21] Appl. No.: 893,918

[22] Filed: Jun. 4, 1992

Related U.S. Application Data

[63] Continuation of Ser. No. 823,998, Jan. 22, 1992, abandoned.

[51] Int. Cl.$^5$ .............................................. C09K 3/14
[52] U.S. Cl. ........................................ 51/298; 51/293; 51/295; 51/307; 51/308; 51/309; 526/261
[58] Field of Search ............... 51/293, 295, 298, 307, 51/308, 309; 526/261

[56] References Cited

U.S. PATENT DOCUMENTS

| | | | |
|---|---|---|---|
| 2,015,658 | 10/1935 | Bezzenberger | 51/298 |
| 3,734,965 | 5/1973 | Becker | 260/570.5 |
| 3,781,172 | 12/1973 | Pett et al. | 51/309 |
| 3,817,976 | 6/1974 | Bakul et al. | 260/190 |
| 3,862,060 | 1/1975 | Anderson et al. | 260/7 |
| 3,887,450 | 6/1975 | Gilano et al. | 522/8 |
| 3,891,408 | 6/1975 | Rowse et al. | 51/309 |
| 3,893,826 | 7/1975 | Quinan et al. | 51/298 |
| 3,895,949 | 7/1975 | Akamatsu et al. | 522/257 |
| 3,933,936 | 1/1976 | Smith et al. | 260/841 |
| 4,047,903 | 9/1977 | Hesse et al. | 51/295 |
| 4,102,866 | 7/1978 | Speranza et al. | 528/135 |
| 4,108,840 | 8/1978 | Friedlander | 525/412 |
| 4,154,724 | 5/1979 | Schulze | 528/68 |
| 4,163,030 | 7/1979 | Banucci et al. | 525/429 |
| 4,165,520 | 8/1979 | Waddill et al. | 525/484 |
| 4,226,971 | 10/1980 | Waddill et al. | 528/162 |
| 4,284,758 | 8/1981 | North | 528/245 |
| 4,285,690 | 8/1981 | North | 528/245 |
| 4,311,631 | 1/1982 | Myers et al. | 523/143 |
| 4,314,827 | 2/1982 | Leitheiser et al. | 51/309 |
| 4,318,766 | 3/1982 | Smith | 522/25 |
| 4,332,586 | 6/1982 | North | 528/245 |
| 4,345,063 | 8/1982 | North | 528/249 |

(List continued on next page.)

FOREIGN PATENT DOCUMENTS 228856 7/1987 European Pat. Off. .
1501331 2/1978 United Kingdom .

OTHER PUBLICATIONS

"Water Compatible Phenolic Resins," *Proceedings of the American Society, Division of Polymeric Materials; Science and Engineering*, 65, pp. 275–276 (1991).

The Handbook of Chemistry and Physics, 58th Ed., pp. C-726-C-732, CRC Press, Inc., West Palm Beach, Fla. (1977).

Kirk–Othmer, *Encyclopedia of Chemical Technology*, 3rd ed., John Wiley & Sons, 1981, NY vol. 17, pp. 349 et seq.

*Primary Examiner*—Mark L. Bell
*Assistant Examiner*—Willie J. Thompson
*Attorney, Agent, or Firm*—Gary L. Griswold; Walter N. Kirn; Jeffrey L. Wendt

[57] ABSTRACT

A coatable, thermally curable binder precursor solution, the solution including a 30–95% solids solution of a thermally curable resin and a reactive diluent. The reactive diluent may be selected form urea derivatives, alkylsubstituted 2-aminoalcohols, β-ketoalkylamides, nitro alkanes, and poly(oxyalkylene) compounds, and has at least one functional group independently reactive with methylol groups of the resin and with aldehydes. The thermally curable resin may include up to 50% (wt of total resin) of an ethylenically unsaturated monomer. Method of making abrasive articles are also presented.

127 Claims, 5 Drawing Sheets

U.S. PATENT DOCUMENTS

| | | | |
|---|---|---|---|
| 4,457,766 | 7/1984 | Caul | 51/298 |
| 4,505,712 | 3/1985 | Floyd et al. | 428/262 |
| 4,505,720 | 3/1985 | Gabor et al. | 51/309 |
| 4,515,835 | 5/1985 | Kuhn et al. | 525/162 |
| 4,518,397 | 5/1985 | Leitheiser et al. | 51/309 |
| 4,571,413 | 2/1986 | Dolden et al. | 524/199 |
| 4,574,003 | 3/1986 | Gerk | 51/309 |
| 4,588,419 | 5/1986 | Caul et al. | 51/298 |
| 4,644,703 | 2/1987 | Kaezmarek et al. | 51/298 |
| 4,650,838 | 3/1987 | Das et al. | 525/504 |
| 4,652,274 | 3/1982 | Boettcher et al. | 51/298 |
| 4,735,632 | 4/1988 | Oxman et al. | 51/295 |
| 4,744,802 | 5/1988 | Schwabel | 51/309 |
| 4,748,043 | 5/1988 | Seaver et al. | 427/30 |
| 4,785,073 | 11/1988 | Frakas et al. | 528/163 |
| 4,786,683 | 11/1988 | Schloman Jr. et al. | 525/54.42 |
| 4,802,896 | 2/1989 | Law et al. | 51/298 |
| 4,903,440 | 2/1990 | Larson et al. | 51/298 |
| 4,904,516 | 2/1990 | Creamer | 528/129 |
| 4,906,774 | 3/1990 | Speranza et al. | 564/57 |
| 4,927,431 | 5/1990 | Buchanan et al. | 51/298 |
| 4,997,717 | 3/1991 | Rembold et al. | 428/413 |
| 5,008,336 | 4/1991 | Richey Jr. et al. | 525/124 |
| 5,026,405 | 6/1991 | Guerro | 51/298 |
| 5,039,759 | 8/1991 | Hoy et al. | 525/437 |
| 5,041,481 | 8/1991 | Sugimori et al. | 524/188 |
| 5,055,113 | 10/1991 | Larson et al. | 51/298 |

COATABLE THERMALLY CURABLE BINDER PRESURSOR SOLUTIONS MODIFIED WITH A REACTIVE DILUENT, ABRASIVE ARTICLES INCORPORATING SAME, AND METHODS OF MAKING SAID ABRASIVE ARTICLES

This application is a continuation-in-part of parent application Ser. No. 07/823,998, filed Jan. 22, 1992, now abandoned and is related to application Ser. No. 07/823,861, filed concurrently with the parent of this application.

BACKGROUND OF THE INVENTION

1. Field of the Invention

This invention relates to abrasive articles utilizing a binder which secures abrasive grains to a backing sheet, on fibers of a fibrous mat, or in a shaped mass, and to methods of making such articles utilizing a binder precursor solution including a reactive diluent. The reactive diluent reduces emissions of volatile organic compounds from the binder precursor solutions and, in some embodiments, renders the cured binder more flexible.

2. Discussion of the Art

Abrasive articles may be categorized as coated, bonded, and nonwoven abrasives. Coated abrasives generally comprise a flexible backing upon which an abrasive coating comprising abrasive grains and a binder is attached. The backing can be selected from paper, cloth, film, vulcanized fiber, etc. or a combination of one or more of these materials, or treated versions thereof. The abrasive grains can be formed of flint, garnet, aluminum oxide, alumina zirconia, ceramic aluminum oxide, diamond, silicon carbide, etc. Binders commonly comprise cured versions of hide glue or varnish, or one or more resins such as phenolic, urea-formaldehyde, melamine-formaldehyde, urethane, epoxy, and acrylic resins. Phenolic resins include those of the phenol-aldehyde type.

Nonwoven abrasive articles typically comprise a fibrous mat of fibers which have on at least a portion of their surface an abrasive coating comprising abrasive grains and a binder. The fibers can be formed from various polymers, including polyamides, polyesters, polypropylene, polyethylene, and various copolymers. Naturally occurring fibers such as cotton, wool, bast fibers and various animal hairs may also be suitable.

Coated and nonwoven abrasives may employ a "make" coating of binder precursor solution, which includes one or more of the above-named resins, in order to secure the abrasive grains to the backing when the resin is cured as well as to orient the abrasive grains on the backing or throughout the lofty fibrous mat. A "size" coating of resinous binder material can be applied over the make coating and abrasive grains in order to firmly bond the abrasive grains to the backing or fibrous mat. The resin of the size coating can be the same as the resin of the make coating or a different material.

In the manufacture of coated and nonwoven abrasives, the make coating and abrasive grains are usually first applied to the backing or lofty fibrous mats, the make coating partially cured, then the size coating is applied, and finally the make and size coatings are fully cured.

Generally, binders which include thermally cured resins provide abrasive articles having excellent properties, e.g., heat resistance. In order to render the resin precursors coatable, obtain the proper coating viscosities, and obtain defect free coatings, solvent is commonly added to the uncured resins.

When polyester or cellulose backings or lofty fibrous mats of such fibers are used, curing temperature is sometimes limited to about 130° C. At this temperature, the long cure time along with solvent removal necessitate the use of festoon curing areas. Disadvantages of festoon curing areas include the emission of volatile organic compounds (VOC) such as organic solvents, unreacted resin precursors such as phenol and formaldehyde, and the like.

Of the many thermally curable resins, including phenolic resins, urea-aldehyde resins, urethane resins, melamine resins, epoxy resins, and alkyd resins, phenolic resins are used extensively to manufacture abrasive articles because of their thermal properties, availability, low cost, and ease of handling. Although phenolic resins are discussed herein, it should be appreciated by those skilled in the art that the principles discussed herein are applicable to other thermally curable resins, such as those previously named. The monomers currently used in greatest volume to produce phenolic resins are phenol and formaldehyde. Other important phenolic starting materials are the alkyl-substituted phenols, including cresols, xylenols, p-tert-butylphenol, p-phenylphenol, and nonylphenol. Diphenols, e.g., resorcinol (1,3-benzenediol) and bisphenol-A (bis-A or 2,2-bis(4-hydroxyphenyl) propane), are employed in smaller quantities for applications requiring special properties.

There are two basic types of phenolic resins: resole and novolak phenolic resins. Molecular weight advancement and curing of resole phenolic resins are catalyzed by alkaline catalysts. The molar ratio of aldehyde to phenolic is greater than or equal to 1.0, typically between 1.0 and 3.0. In the production of adhesive coatings for nonwoven and coated abrasives, one standard starting phenolic resin composition is a 70% solids condensate of a 1.96:1.0 formaldehyde:phenol mixture with 2% potassium hydroxide catalyst added based on weight of phenol. The phenolic resin composition is typically 25-28% water and 3-5% propylene glycol ether, which are required to reduce viscosity of the resin. Before this resin is used as a component of a make or size coating, i.e., to make it coatable, further viscosity reduction is often achieved using VOC. A binder precursor solution containing a phenolic resin which is used to produce a make coating may contain up to 40% of a VOC such as isopropyl alcohol to reduce viscosity and make the phenolic resin compatible with resin modifiers (flexibilizers), while a binder precursor solution which is used to produce a size coating might contain up to 20% of a VOC such as diethylene glycol ethyl ether. Unreacted phenol and formaldehyde in the final, cured resin also contribute to VOC.

In order to reduce emissions of VOC, efforts have been made to increase the water compatibility of phenolic resins. Fisher, in a review article without references titled "Water Compatible Phenolic Resins" in *Proceedings of the American Chemical Society, Division of Polymeric Material: Science and Engineering;* 65 pp. 275–276 (1991), describes currently known methods of making "water compatible" phenolic resins, their benefits, and their shortcomings.

Unfortunately, the water tolerance of phenolic resins suffers in many of the formulations designed to reduce VOC. "Water tolerance" refers to the measurement of the maximum weight percent of distilled water, based on initial resin weight, which can be added to a stirred, uncured phenolic resin via titration to begin causing visual phase separation (as evidenced by a milky appearance) of the resin/water mixture into aqueous and organic phases. As mentioned by Hoy et al, below, it is imperative that during the drying stage, after a particular substrate has been covered with a layer of coating, that a single phase be maintained until the water has evaporated away leaving the now insoluble organic polymer deposit. Another problem with many water compatible phenolic resins is that gel time is increased. "Gel time", as used herein, refers to the length of time at a given temperature that a phenolic resin transforms from a liquid to a gelled state. It is an indication of the rate of cure of a phenolic resin under established conditions.

Phenolic resins suitable for use in the manufacture of abrasive articles may optionally contain plasticizers, crosslinking aids, or other modifiers. Modifiers have been used to overcome deficiencies of phenolic resins in certain applications such as brittleness in the cured state and lack of water tolerance in the uncured state. Modifiers have previously been used to adjust the physical properties of the finished product, such as hardness in a wet environment, but many have required additional VOC for viscosity reduction.

It is known that nitroalkanes and urea react with formaldehyde, but these compounds have not been used as reactive diluents in the production of abrasive articles to the inventors' knowledge. It is also known that poly(oxyalkylene) amines react with phenolic resins, and there have been attempts by assignee to commercialize nonwoven abrasive articles employing poly(oxyalkylene) amines having molecular weight of 400 and above. These attempts were largely unsuccessful. The high molecular weight poly(oxyalkylene) amines typically require an organic solvent to render coatable the binder precursor solution in which they are mixed.

U.S Pat. No. 4,571,413 to Dolden et al. describes the use of polyethers [poly(oxyalkylene) diamines] in the preparation of modified phenolic resins for use in fiber-reinforced composite materials and phenolic foams. Improved impact strength and flexural properties are noted. 2-45 parts of polyether per 100 parts aqueous phenolic resin are suggested. All resole resins were acid catalyzed. There is no mention of base-catalysis, applicability to abrasive compositions, or lowering of VOC.

U.S. Pat. No. 4,786,683 to Schloman, Jr. et al. describes modified guayule resins containing poly(oxyalkalene) amines and phenolic resins for use as rubber modifiers.

U.S. Pat. No. 4,163,030 to Banucci et al. describes blends of polyetheramide-imide compounds and phenolic resins. Applicability to solventless dry powder coatings and electrical insulation is noted.

U.S. Pat. No. 3,734,965 to Becker describes poly(oxyalkalene) compounds with aldehydes and substituted phenols as curatives for epoxy resins.

U.S. Pat. No. 4,226,971 to Waddill e al. describes an epoxy curing agent derived from the phenol-aldehyde condensation product with the aminoalkylene derivative of a poly(oxyalkalene) polyamine.

U.S. Pat. No. 3,933,936 to Smith et al. describes aziridine-modified phenolic resins with good bond to wood, metal, ceramics, and plastics, and which have fast cure. There is no mention of abrasive applications, poly(oxyalkalene) compounds, or reduction of VOC.

U.S. Pat. No. 4,650,838 to Das et al. describes aromatic phthalocyanine compounds as modifiers for phenolic resins. Improved thermal stability and applicability to friction materials are noted. Novolaks or resolated novolaks are the focus.

U.S. Pat. No. 5,041,481 to Sugimori et al. describes amino compound adhesion promoters for curable compositions such as paints, adhesives, or sealing compounds.

U.S. Pat. No. 4,102,866 to Speranza et al. describes poly(oxyalkalene) compounds as a curative for epoxy-novolak resins.

U.S. Pat. No. 4,164,520 to Waddill et al. describes a process employing poly(oxyalkalene) compounds to accelerate the cure of epoxy resins.

British Patent No. 1,501,331 to Minnesota Mining and Manufacturing Company describes the use of poly(oxyalkalene) compounds with epoxy resins to manufacture friction materials.

U.S. Pat. No. 4,906,774 to Speranza et al. describes the preparation of urea-linked diamine product from poly(oxyalkalene) diamines and diisocyanates.

U.S. Pat. No. 4,154,724 to Schulze describes the preparation of ureido-functional poly(oxyalkalene) compounds.

U.S. Pat. No. 5,039,759 (Hoy, et al.) discloses the use of reactive urea, thiourea, and carbamate derivatives as cosolvents and reactive diluents for modifying water dispersible resins including polyester alkyd resins, carboxylated hydroxyl-containing epoxy fatty acid esters, carboxylated polyesters, carboxylated alkyd resins, carboxylated acrylic interpolymers free of amide groups, and carboxylated vinyl interpolymers. While utility in these systems is disclosed, there is no suggestion of the use of reactive urea, thiourea, or carbamate derivatives as reactive diluents in phenolic or urea-aldehyde resin systems.

U.S. Pat. No. 3,862,060 (Anderson) descibes stable emulsions containing high concentrations of thermosettable phenol-formaldehyde resole resins as the dispersed phase. The emulsions exhibit a water tolerance of less than 40 percent, and are stabilized with a proteinaceous compound. The resole resins are prepared with amine catalysts and are preferably modified with melamine. The emulsions optionally contain urea or dicyandiamide, which act to reduce the free formaldehyde.

U.S. Pat. No. 5,008,336 (Richey, Jr., et al.) describes tri-substituted amino oxides having at least two reactive hydroxyls useful as reactive diluents in polyol polymer-containing coating compositions.

U.S. Pat. No. 4,903,440 (Larson, et al.) describes a modified resole phenolic resin for use in abrasive articles containing a binder having at least 1.1 pendant alpha, beta-unsaturated carbonyl groups per molecule but does not suggest the storage life benefits of the compositions described herein, nor the compositions themselves.

U.S. Pat. No. 3,817,976 (Bakul, et al.) discloses the use of a butadiene-nitrile rubber as a modifier, but requires the use of additional organic solvents.

U.S. Pat. No. 4,505,712 (Floyd, et al.) and U.S. Pat. Nos. 4,345,063; 4,285,690; 4,332,586; and 4,284,758 (North) describe the use of cyclic urea derivatives for treating textile fabrics and paper in the absence of formaldehyde, but likewise requires organic solvent additions.

U.S. Pat. No. 4,927,431 (Buchanan, et al.) describes a modified phenolic resin binder for use in abrasive articles which contains a radiation-curable component containing pendant acrylate groups, but requires the addition of organic solvents.

U.S. Pat. No. 5,026,405 (Guerro) describes a modified phenolic resin incorporating certain alkyl or hydroxyalkylcarbamylmethyl triazines to improve the wet strength of bonded abrasive articles. The dry strength of the abrasive articles is diminished, however.

U.S. Pat. No. 4,802,896 (Law, et al.) discloses a modified phenolic resin binder for use in abrasive articles which contains a thermally-stable aromatic ligand. Added organic solvents are required in this composition as well.

U.S. Pat. No. 4,904,516 (Creamer) describes a water soluble phenolic resin containing a soluble alkaline earth metal salt for use in binding glass fiber batts.

Other patents which are of interest include U.S. Pat. Nos. 4,785,073; 4,311,631; 4,515,835; and 4,108,840.

This invention addresses many of the above problems associated with binder precursor solutions which include one or more thermally curable resins (including phenolic resins) which are used as binders in the manufacture of abrasive articles.

As emissions of VOC are increasingly being regulated, an unmet need exists in the art of manufacturing abrasive articles for coatable, thermally curable binder precursor solutions which reduce or substantially eliminate the use of VOC as solvents and which scavenge unreacted resin precursors such as phenol and aldehydes. It would also be advantageous if a coatable, thermally curable binder precursor solution could be developed having increased water tolerance and dry hardness (i.e., cured binder hardness), and gel time comparable to or less than previously known coatable, thermally curable binder precursor solutions, while reducing VOC emissions.

SUMMARY OF THE INVENTION

The present invention overcomes or reduces many of the aforementioned problems associated with previously known coatable, thermally curable binder precursor solutions. In accordance with the present invention, coatable, thermally curable binder precursor solutions are presented having excellent water tolerance, gel time comparable to or less than previously known binder precursor solutions, and reduced VOC emissions. When cured, the binder precursor solutions allow abrasive articles to exhibit abrading performance not unlike abrasive articles made with previously known binder precursor solutions. In addition, the varying nature of specific embodiments of the reactive diluents allows the abrasive articles of the invention to range in flexibility and hardness between that of epoxy-based and phenolic-based binders.

Coatable, thermally curable binder precursor solutions in accordance with the invention comprise a 30–95% solids solution, more preferably 60–80% solids solution of a thermally curable resin having a plurality of pendant methylol groups, the balance of the solution comprising water and a reactive diluent.

The term "coatable", as used herein, means that the solutions of the invention may be easily coated or sprayed onto substrates using coating devices which are conventional in the abrasives art, such as knife coaters, roll coaters, flow-bar coaters, electrospray coaters, and the like. This characteristic may also be expressed in terms of viscosity of the solutions. The viscosity of the coatable, thermally curable binder precursor solutions should not exceed about 2000 centipoise, measured using a Brookfield viscometer, number 2 spindle, 60 rpm, at 25° C. The term "percent solids" means the weight percent organic material that would remain upon application of curing conditions. Percent solids below about 30% are not practical to use because of VOC emissions, while above about 95% solids the resin solutions are difficult to render coatable, even when heated. The term "diluent" is used in the sense that the reactive diluent dilutes the concentration of thermally curable resin in the solutions of the invention, and does not mean that the solutions necessarily decrease in viscosity.

The thermally curable resin is the reaction product of a non-aldehyde and an aldehyde, the non-aldehyde selected from the group consisting of ureas and phenolics.

The reactive diluent has at least one functional group which is independently reactive with the pendant methylol groups and with the aldehyde, and is selected from the group consisting of A) compounds selected from the group consisting of compounds represented by the general formula

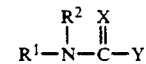

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R$^1$ and R$^2$ or R$^1$ and R$^3$ can be linked to form a ring structure; and
(iii) R$^1$, R$^2$, R$^3$, R$^4$ and R$^5$ are never all hydrogen at the same time;

B) compounds having molecular weight less than about 300 and selected from the group consisting of alkyl-substituted 2-aminoalcohols, β-ketoalkylamides, and nitro alkanes;

C) poly(oxyalkylene) amines having molecular weight ranging from about 90 to about 1000; and D) poly(oxyalkylene) ureido compounds having molecular weight ranging from about 90 to about 1000.

Preferred reactive diluents include those wherein X is O, Y=NR$^3$R$^4$, R$^1$ is 2-hydroxyethyl, R$^2$ and R$^3$ are linked to form an ethylene bridge, and R$^4$ is hydrogen.

A preferred alkylsubstituted 2-aminoalcohol useful as a reactive diluent is 2-amino-2-methyl-1-propanol, while a preferred β-ketoalkylamide is β-ketobutyramide.

Additionally, nitroalkanes with at least 1 active hydrogen atom attached to the alpha carbon atom will scavenge formaldehyde in coatable thermally curable binder precursor solutions of this invention.

Representative poly(oxyalkylene) amines include poly(oxyethylene-co-oxypropylene) amine, poly(oxypropylene) amine, and poly(oxypropylene) diamine, whereas representative poly(oxyalkylene) ureido compounds are the reaction product of urea and the poly(oxyalkylene) amines previously enumerated.

Optionally, the coatable, thermally curable binder precursor solutions of the invention may include up to about 50 weight percent (of the total weight of thermally curable resin) of ethylenically unsaturated monomers. These monomers, such as tri- and tetra-ethylene glycol diacrylate, are radiation curable and can reduce the overall cure time of the thermally curable resins by providing a mechanism for pre-cure gelation of the thermally curable resin.

Another aspect of the invention is an abrasive article comprising a plurality of abrasive grains dispersed and adhered within a binder, the binder formed from a coatable, thermally curable binder precursor solution exhibiting substantially reduced emissions of VOC, the binder precursor solution comprising the reaction product a 30-95% solids solution of a thermally curable resin having a plurality of pendant methylol groups, the balance comprising water, and a reactive diluent, wherein preferred resins and reactive diluents are as above described. Specifically preferred are coated, nonwoven, and bonded abrasive articles incorporating these preferred binders.

Still another aspect of the invention is a method for making nonwoven abrasive articles of the type comprising a lofty, open, fibrous mat of fibers which have on at least a portion of their surface an abrasive coating comprising grains and a binder. The abrasive grains are secured to the fibers by the binder. The method includes the steps of:

(a) adhering abrasive grains to the fibers of a lofty, open fibrous mat with a coatable, thermally curable binder precursor solution, as above described, with the proviso that if the reactive diluent is a poly(oxyalkylene) amine the molecular weight of the poly(alkylene) amine is less than about 300, to provide a coated mat comprising an abrasive layer on the fibers; and (b) subjecting the coated mat to conditions sufficient to cure the binder precursor solution.

One particularly preferred method comprises:

(a) combining thermally curable resin with reactive diluent, both as above described, to form a coatable, thermally curable binder precursor solution, at a temperature below that necessary to cure the coatable thermally curable binder precursor solution;

(b) adding abrasive grains to the coatable, thermally curable binder precursor solution;

(c) coating the abrasive-filled, coatable, thermally curable binder precursor solution onto at least a portion of the fibers of a lofty, open fibrous mat; and (d) heating the abrasive coated mat of step (c) to a temperature sufficient to cure the coatable, thermally curable binder precursor solution.

An optional step is to apply additional abrasive grains to the coated mat produced by step (c) prior to step (d).

A method of making a bonded abrasive article is also presented. The method includes the steps of:

(a) combining a coatable, thermally curable binder precursor solution comprising a thermally curable resin and a reactive diluent, both as above described, with abrasive grains to provide a mixture; and (b) subjecting the mixture of step (a) to conditions sufficient to cure the coatable, thermally curable binder precursor solution.

A further method is presented for making a coated abrasive article, the method including the steps of:

(a) coating a backing with a coatable, thermally curable binder precursor solution comprising a thermally curable resin, reactive diluent, both as above described, and abrasive grains to provide a coated backing; and (b) subjecting the coated backing to conditions sufficient to cure the coatable, thermally curable binder precursor solution.

A preferred method of making a coated abrasive article includes the steps of:

(a) applying a first coatable, thermally curable binder precursor solution to at least one major surface of a backing to form a make coating precursor, the coatable, thermally curable binder precursor solution comprising a thermally curable resin and reactive diluent, having compositions as above described;

(b) applying abrasive grains to the make coating precursor of step (a) to form a wet abrasive coating;

(c) subjecting the wet abrasive coating to conditions sufficient to at least partially solidify the make coating precursor and form an abrasive coating;

(d) applying a second coatable, thermally curable binder precursor solution which is the same as or different than the first to the abrasive coating to form a size coating over the abrasive coating of step (c); and (e) subjecting the structure of step (d) to conditions sufficient to cure the first and second coatable, thermally curable binder precursor solutions.

In each of the above-described methods, the preferred thermally curable resin is a phenol-formaldehyde resin, more preferably a resole phenol-formaldehyde resin, and the preferred conditions for curing are by heating. Abrasive articles made using the materials and methods described herein exhibit excellent resistance to performance deterioration, especially in wet environments, and afford the abrasives manufacturer with a great degree of flexibility in producing abrasive articles of varying degrees of flexibility. Decreased emissions of VOC is one advantage of the methods of making the abrasive articles in accordance with the teachings herein.

Other aspects and advantages of the invention will become apparent from the detailed description which follows.

DESCRIPTION OF PREFERRED EMBODIMENTS

Figure 2:
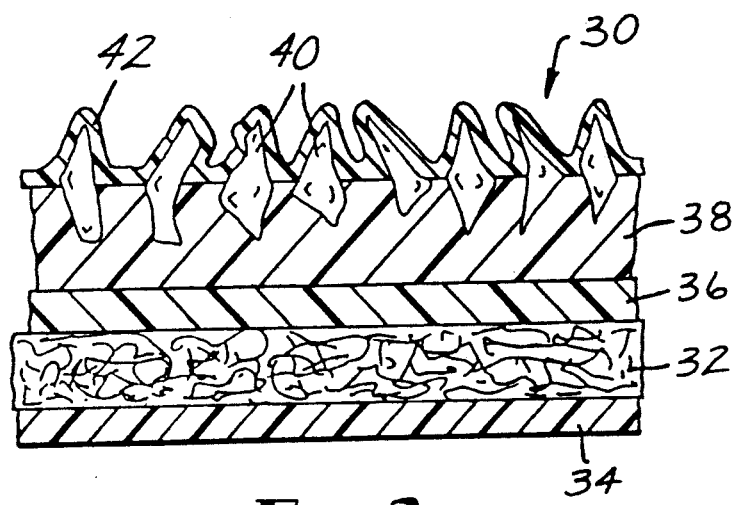
FIGS. 1 and 2 show enlarged cross-sectional views of coated abrasives made in accordance with the present invention.

As used herein, the term "coatable, thermally curable binder precursor solution" means a coatable, homogeneous mixture including uncured thermally curable resin, reactive diluent, and water, which, upon curing, becomes a binder. The term "binder" means a cured binder. The term "thermally curable resins" as used herein means phenolaldehyde or urea-aldehyde resins, which may include up to about 50 weight percent of one or more ethylenically unsaturated monomers such as triethylene glycol diacrylate, which are sometimes used to gel or precure the thermally curable resins (and thus reducing the time required for thermal cure) by providing a monomer which is radiation curable. Thus, the thermally curable resins are the reaction product of a non-aldehyde and an aldehyde, which may have an interpenetrating radiation curable polymer network therein when cured. "Non-aldehyde" includes urea, straight and branched alkyl substituted ureas, and aryl-substituted ureas, as well as phenol, alkyl and aryl substituted phenols, including cresols, xylenols, resorcinol, p-tert-butyl-phenol, p-phenylphenol, and nonylphenol, and diphenols, e.g., bis-phenol-A. "Methylol group" means a radical having —CH$_2$OH at its terminus.

REACTIVE DILUENTS

In accordance with the present invention, "reactive diluent" refers to the class of compounds having at least one functional group independently reactive with the pendant methylol groups of the thermally curable resin and with aldehydes, and which have the capability of functioning to "scavenge" unreacted aldehydes when the coatable, thermally curable binder precursor solution cures. Preferably, reactive diluents used in the coatable, thermally curable binder precursor solutions of the present invention are low to moderate molecular weight compounds, typically having a molecular weight ranging from about 60 to about 1000. Reactive diluent molecular weights less than about 600 are preferred, and particularly those having molecular weight less than about 300. Reactive diluents useful in the invention have solubility parameters which allow the coatable, thermally curable binder precursor solution to avoid phase separation (or increase water tolerance) during processing when diluted with water.

Representative of functional groups reactive with either the methylol groups of the thermally curable resin or with aldehydes and useful in this invention are R'—NH—R"; —NR'R"; and —NR'(C=O)—NR"R'", wherein R', R'", and R"" may be hydrogen or substituted or unsubstituted hydrocarbons, but if substituted, the substituent or substituents should be those which do not inhibit or prevent reaction with the methylol groups or aldehydes. Typical examples of the R substituents include alkyl, e.g., methyl, ethyl, aryl, e.g., phenyl, alkoxy, and carbonyl. Representative and preferred other functional groups reactive with methylol groups are —OH, —NH$_2$, and H$_2$N—(C=O)—NH—. If the reactive diluent is aldehyde functional, it will substitute on the aromatic phenol ring.

One chemical family of especially preferred reactive diluents meeting the above preferred characteristics include those compounds represented by the general formula:

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$, and R$^5$ is a monovalent radical selected from the group consisting of hydrogen, alkyl groups having 1 to about 10 carbon atoms, hydroxyalkyl groups having about 2 to 4 carbon atoms and one or more hydroxyl groups, and hydroxypolyalkyleneoxy groups having one or more hydroxyl groups and with the provisos that:

(i) said compound contains at least one —NH and one —OH group or at least two —OH groups or at least two —NH groups;

(ii) R$^1$ and R$^2$ or R$^1$ and R$^3$ can be linked to form a ring structure; and (iii) R$^1$, R$^2$, R$^3$, R$^4$ and R$^5$ are never all hydrogen at the same time.

Representative examples of reactive diluents which are useful in the practice of the invention and represented by general formula (I) include those wherein X is O, Y=NR$^3$R$^4$, R$^1$ is 2-hydroxyethyl, R$^2$ and R$^3$ are linked to form an ethylene bridge, and R$^4$ is hydrogen (structure II); those wherein X is O, Y=NR$^3$R$^4$, R$^1$ and R$^3$ are hydrogen, R$^2$ is butyl and R$^4$ is hydroxyethyl (structure III); and those wherein X is O, Y=NR$^3$R$^4$, R$^1$ and R$^3$ are hydrogen, R$^2$ is ethyl and R$^4$ is butyl. Structures II and III and other representative urea derivatives are shown below:

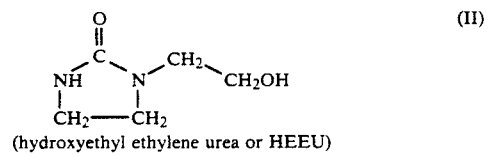
(hydroxyethyl ethylene urea or HEEU)

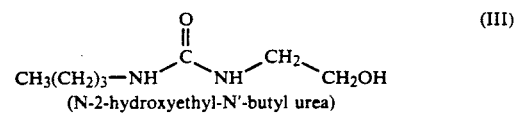
(N-2-hydroxyethyl-N'-butyl urea)

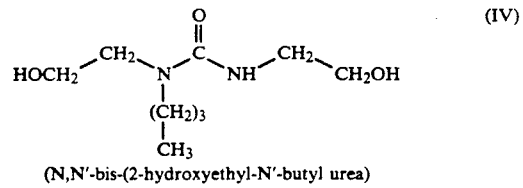
(N,N'-bis-(2-hydroxyethyl-N'-butyl urea)

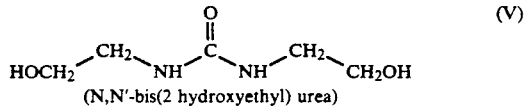
(N,N'-bis(2 hydroxyethyl) urea)

Other urea compounds useful as reactive diluents in the present invention are listed in column 7 of U.S. Pat. No. 5,039,759, which is incorporated herein by reference. Reactive diluent compound (II) is available under the trade designation "UCAR RD-65-2", from Union Carbide Corporation.

Representative examples of reactive diluents which are useful in the practice of the present invention are thiourea compounds represented by general formula (I) above only wherein X=S. Similarly, examples of representative reactive diluents which are carbamates within the generic structure (I) shown above include compounds VI, VII, and VIII:

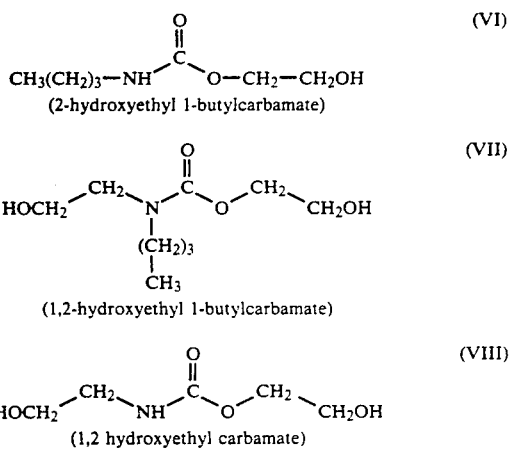

and others listed in column 9 of U.S. Pat. No. 5,039,759, incorporated herein by reference.

Preparation of the above mentioned ureas, thioureas, and carbamates proceeds by methods known in the art. For example, preparation of N-(2-hydroxyethyl)-N, N'-ethylene urea may proceed by reacting equimolar mixtures of amino ethyl ethanolamine and dimethyl carbamate in a nitrogen purged vessel with heating (about 80° C.). The mixture is stirred for about three hours before being allowed to stand overnight. The mixture is then heated again while recovering methanol and other volatile materials up to about 195° C. The material remaining in the vessel is then subject to vacuum distillation, producing a distillate of the urea. Details on preparing this and other ureas are disclosed in U.S. Pat. No. 5,039,759, columns, 9-13, which are incorporated herein by reference.

Another chemical family of especially preferred reactive diluents are poly(oxyalkylene) compounds such as poly(oxyalkylene) amines (POAA) and poly(oxyalkylene) ureides having molecular weight ranging from about 90 to about 1000. The poly(oxyalkylene) compounds useful in the invention may or may not have terminal amine functionality.

One group of useful poly(oxyalkylene) amines are monoamines selected from the group consisting of compounds represented by the general formula $$R^6-O-(CHCH_2)_n-(CH_2CH_2O)_m-CH_2CHNH_2$$
$$\quad\quad\quad\quad\ \ |\quad\quad\quad\quad\quad\quad\quad\quad\quad\quad\quad\ |$$
$$\quad\quad\quad\quad CH_3\quad\quad\quad\quad\quad\quad\quad\quad\quad\ CH_3$$

wherein $R^6$ is an alkyl group having 1 to 4 carbon atoms and n and m are integers ranging from 0 to 20.

Useful poly(oxyalkylene) amines which are diamines are selected from the group consisting of compounds represented by the general formula

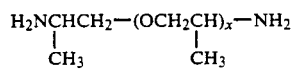

wherein x is an integer ranging from about 2 to about 20. A variation of these are the poly(oxyalkylene) amines selected from the group consisting of compounds represented by the general formula

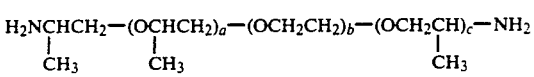

wherein a, b, and c are integers, the sum of a plus c ranges from 1 to 5, and b ranges from 0 to 20. Finally, poly(oxyalkylene) amines which are triamines and useful in the invention are selected from the group consisting of compounds represented by the general formula

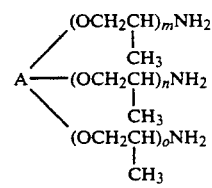

wherein m, n, and o are integers greater than zero such that the sum of m, n, and o ranges from about 5 to about 30, and wherein A is a triol initiator, such as trimethylolpropane, glycerine, or the like.

Representative examples of poly(oxyethylene) amine reactive diluents which are useful in the practice of the invention include: poly(oxyethylene-co-oxypropylene) amine, poly(oxypropylene) amine, poly(oxypropylene) diamine, poly(oxyethylene-co-oxypropylene) diamine, poly(oxyethylene-co-oxypropylene) urea, poly(oxyethylene-co-oxypropylene) diurea, and the trifunctional reaction products of glycerine or trimethylolpropane with hydroxy-terminated poly(oxypropylene) amine. Reactive diluents which are poly(oxyethylene) amines are available under the trade designation "Jeffamine" from Texaco Chemical Company, Houston, Tex. trade designation "Jeffamine" from Texaco Chemical Company, Houston, Tex.

As mentioned previously, the reactive diluents in accordance with the invention have two reactive functional groups: one reactive functional group of the reactive diluent (RD) reacts either with the methylol groups of the thermally curable resin A to form intermediate B (Reaction I shown below) or with the aldehyde to form intermediate C (Reaction II). Intermediate C subsequently reacts with compound A (Reaction III) to form a second intermediate D. The other reactive functional group of the reactive diluent, in this case on intermediate B, subsequently reacts with a methylol group (Reaction IV) of intermediate D to form intermediate E, and so on. Thus, reactive diluents useful in the present invention have the capability to "scavenge" (i.e., react with and bind into the cured mass) aldehydes which would otherwise be emitted to the workplace and open environment.

The reactive diluents useful in the coatable, thermally curable binder precursor solutions of the present invention reduce or eliminate the need for resin flexibilizers such as the commonly used polyamide flexibilizer known under the trade name "Epicure". However, polyamide flexibilizers commonly used are compatible with the coatable, thermally curable binder precursor solutions described herein. The polyamide flexibilizer known under the trade name "Epicure" is the reaction product of a $C_{36}$ dimer acid and a polyamine, e.g., diethylene triamine.

from about 70 to about 260 weight percent water referenced to weight of phenolic resin. The high water tolerances are acheived by increasing the amount of alkaline catalyst. The lower water tolerance of 70 weight percent is typically achieved with reactive diluent only and no additional alkaline catalyst, while the higher water tolerance is acheived with about 3.2 parts additional

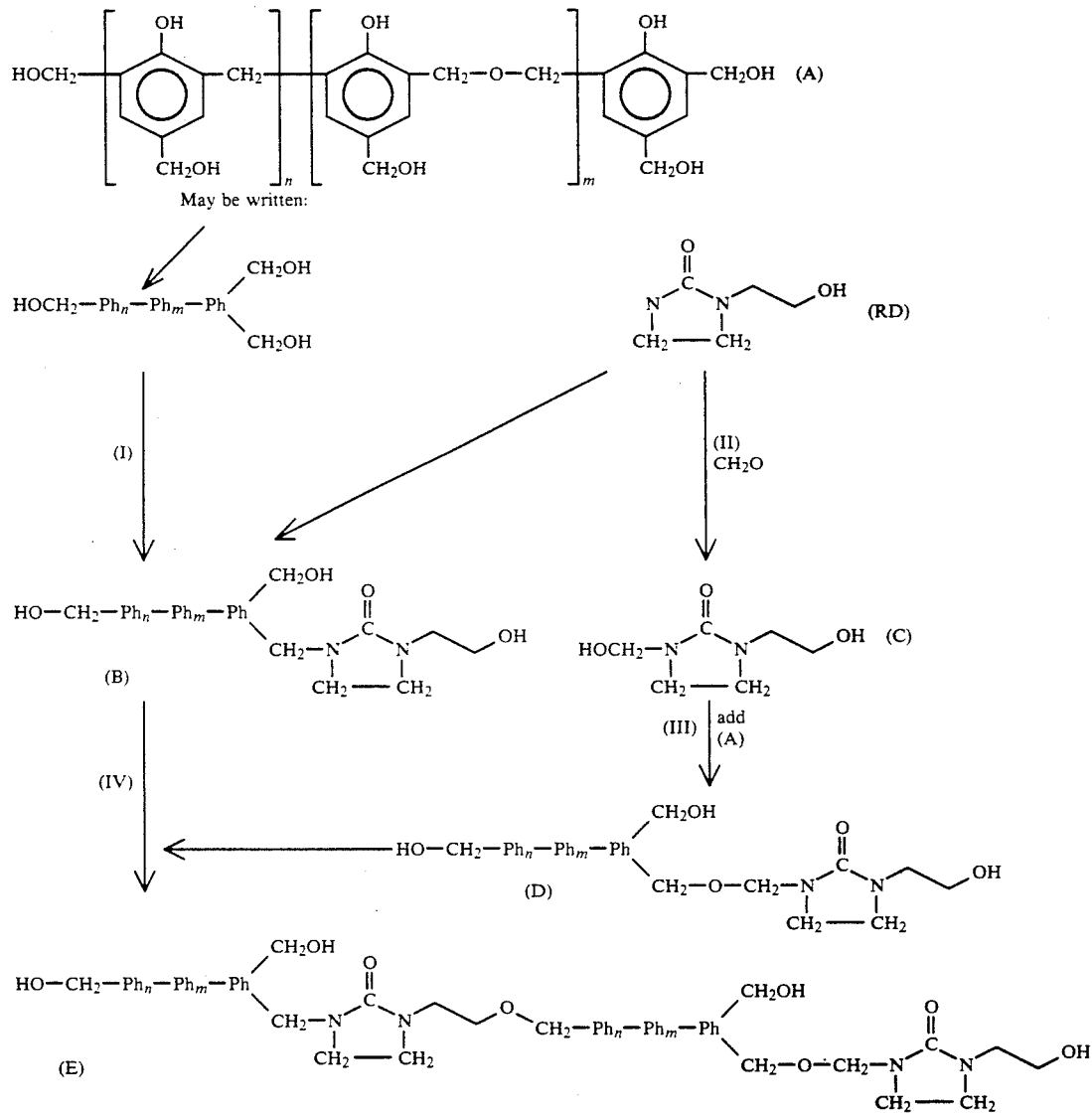

Reactive diluents useful in the binder precursor solutions of the present invention preferably have a solubility parameter of at least about 12 $(cal-cm^{-3})^{\frac{1}{2}}$ (commonly known as Hildebrand units). Solubility parameters above this value tend to allow higher water tolerance coatable, thermally curable binder precursor solutions to be made. A discussion of solubility parameters of organic compounds and how to derive them from physical data is given in *The Handbook of Chemistry and Physics*, 58th Ed, pp C-726-C-732, published 1977 by CRC Press, Inc., West Palm Beach, Fla., and is incorporated herein by reference.

For a coatable, thermally curable binder precursor solution in accordance with the present invention having 100 parts of a standard phenolic resin to 10 parts HEEU reactive diluent, the water tolerance ranges alkaline catalyst and 10 parts reactive diluent, referenced to a standard phenolic resin having 2% potassium hydroxide per weight of phenol. In a coatable, thermally curable binder precursor solutions of the invention having 100 parts standard phenolic resin and 15 parts of the reactive diluent HEEU, water tolerance ranges from about 90 to about 320 weight percent, with the same range of alkaline catalyst.

Other structural classes of reactive diluents useful in the invention having properties similar to the ureas, thioureas, and carbamates mentioned above (i.e., having at least one functional group reactive with the methylol groups of the thermally curable resin and at least one functional group reactive with aldehydes) may be used in the coatable, thermally curable binder precursor of the present invention. One class includes alkylsubstituted 2-aminoalcohols such as 2-amino-2-hydroxymethyl-1,3-propane diol, 2-aminoethanol, 2-amino-2-methyl-1-propanol, 2-amino-1-butanol, 2-amino-2-methyl-1,3-propanediol, 2-amino-2-ethyl-1,3-propanediol and 2-amino-2-hydroxymethyl-1,3-propanediol. These components react with aldehydes, for example, formaldehyde, according to Reaction V:

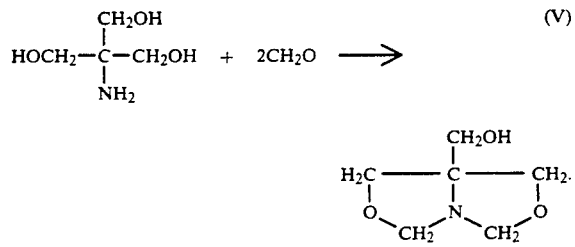

A further class of reactive diluents useful in the coatable, thermally curable binder precursors of the present invention as formaldehyde scavengers includes β-ketoalkylamides such as β-ketobutyramide (IX) available from Eastman Chemicals.

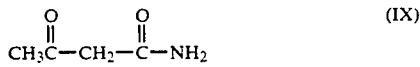

Aldehydes are known to react with "active methylene" compounds such as (IX) to form a number of stable condensation products. N-substituted β-ketobutyramides derived from the reaction of diketene with amino-alcohols such as 2-aminoethanol, 2-amino-2-methyl-1-propanol, 2-amino-1-butanol, 2-amino-2-methyl-1,3-propanediol, 2-amino-2-ethyl-1,3-propanediol and 2-amino-2-hydroxymethyl-1,3-propanediol may also function as reactive diluents in phenolic resins to obtain better combinations of aldehyde scavenging, improved water tolerance and final resin properties.

As previously mentioned, nitroalkanes, e.g., nitromethane, nitroethane, 2-nitropropane with at least 1 active hydrogen atom attached to the alpha carbon atom also scavenge formaldehyde in coatable, thermally curable binder precursor solution of this invention.

THERMALLY CURABLE RESINS

The thermally curable resins employed in the coatable, thermally curable binder precursor solutions of this invention are preferably selected from the group consisting of phenolic and urea-aldehyde resins, and mixtures thereof. The resins comprise the reaction product of an aldehyde and a non-aldehyde. Phenolic resins are preferred because of their thermal properties, availability, low cost, and ease of handling. The general term "phenolic" includes phenol-formaldehyde resins as well as resins comprising other phenol-derived compounds and aldehydes. The thermally curable resins preferably are 30–95% solids, more preferably 60–80% solids, with a viscosity ranging from about 750 to about 1500 cps (Brookfield viscometer, number 2 spindle, 60 rpm, 25° C.) before addition of water and reactive diluent, and having molecular weight (number average) of at least about 200, preferably varying from about 200 to 700.

As explained previously there are two basic types of phenolic resins: resole and novolak. Resole phenolic resins can be catalyzed by alkaline catalysts, and the molar ratio of formaldehyde to phenol is greater than or equal to one, typically between 1.0 to 3.0, thus presenting pendant methylol groups.

Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water. Typical commercially available phenolic resins have 2% by weight of phenolic of alkaline catalyst. Typically, additional catalyst solution comprising a 50% (wt of total) solution of sodium hydroxide (NaOH) in water may be added to adjust water tolerance and further aid advancing the resin molecular weight.

Resole phenolic resins are thermally curable (thermosetting) resins, and, in the cured form, exhibit excellent toughness, dimensional stability, strength, hardness, and heat resistance. "Resolated novolaks" are novolak resins to which an amount of aldehyde is added to increase the aldehyde/phenol ratio above 1:1. They can be used as thermally curable resins herein. A general discussion of phenolic resins and their manufacture is given in Kirk-Othmer, *Encyclopedia of Chemical Technology*, 3rd Ed., John Wiley & Sons, 1981, N.Y., Vol. 17, p. 349-et. seq., incorporated herein by reference.

The above mentioned properties make cured resole phenolic resins particularly preferable as binders for abrasive grains. However, when uncured phenolic resins are processed with water, as is common to reduce VOC emissions, the uncured phenolic binder precursor solution exhibits partial phase separation due to its molecular weight and only partial water solubility. However, the present invention substantially overcomes this problem by combining the uncured resole phenolic resin with a reactive diluent having the properties and structure described herein. The coatable, thermally curable binder precursor solutions of the present invention have improved water tolerance, substantially equal gel times, and very low VOC as compared with unmodified 100% (by weight of total resin) phenolic resins. The coatable, thermally curable binder precursor solutions of the present invention utilizing reactive diluents represented by general formula I produce abrasive products having grinding performance substantially equal to unmodified 100% (by weight of total resin) phenolic resin-based abrasive products. Coatable, thermally curable binder precursor solutions of the present invention utilizing poly(oxyalkylene) amine reactive diluents produce abrasive products having hardness and flexibility intermediate to those of unmodified 100% (by weight of total resin) phenolic resin-based abrasive articles and 100% epoxy resin-based abrasive articles.

Aldehydes which are useful in forming the thermally curable resins useful in the coatable, thermally curable binder precursor solutions of the present invention include cyclic, straight and branched chain alkyl aldehydes, which can be saturated or unsaturated, and aromatic aldehydes. Preferably, the aldehydes have molecular weight below about 300 to afford a less viscous binder precursor solution. Examples of suitable aldehydes include formaldehyde, benzaldehyde, propanol, hexanal, cyclohexane carboxaldehyde, acetaldehyd,, butyraldehyde, valeraldehyde, and other low molecular weight aldehydes. Preferred is formaldehyde, for its availability, low cost, cured resin properties, and because it affords low viscosity binder precursor solutions.

Both the resole and novolak phenolic resins (including resolated novolaks) are curable by heat. Novolak phenolic resins require a source of formaldehyde to effect cure, such as hexamethylene tetramine or a resole. Temperature and pH significantly affect the mechanism of polymerization and the final properties of the cured resin. Examples of commercially available phenolic resins include those known by the trade names "Varcum" (from BTL Specialty Resins Corp.), "Aerofene" (from Ashland Chemical Co.), and "Bakelite" (from Union Carbide). A standard, 70% solids, 1.96:1.0 formaldehyde/phenol phenolic resin having 2 weight percent KOH per weight of phenol is available from Reichold Chemicals, Mississauga, Ontario, Canada.

Although the reactive diluent is preferably premixed with the thermally curable resin for preparing the coatable, thermally curable binder precursor solutions of the invention, with some reactive diluents, such as the POAA's, the thermally curable resin may be premixed with a quantity of water sufficient to absorb some of the exothermic heat evolved when the POAA is mixed with the resin. The weight ratio of resin to reactive diluent can range from about 2:1 to about 100:1 for all reactive diluents useful in the invention, and from about 1:1 to about 100:1 for POAA reactive diluents. Typically a suitable solvent is then added as needed to render the binder precursor solution coatable. The solvent is preferably water for all reactive diluents useful in the invention, but those skilled in the art will realize with minimal experimentation that an organic solvent may be necessary depending on the coating method chosen. When water is used as the solvent it is preferably added up to the water tolerance of the binder precursor solution, although this is not necessary. A water tolerance greater than about 100% is preferred, greater than about 150% especially preferred.

ETHYLENICALLY UNSATURATED MONOMERS

Ethylenically unsaturated monomers can also be added to the coatable, thermally curable binder precursor solutions of this invention, with the proviso that if the ethylenically unsaturated monomer chosen is an acrylate, the reactive diluent cannot be amine terminated. Ethylenically unsaturated monomers are sometimes added to thermally curable resins to provide a mechanism for gelation, by use of an appropriate radiation source, to form an interpenetrating polymer network within the thermally curable resin.

Ethylenically unsaturated monomers suitable for this invention include monomeric or polymeric compounds that contain atoms of carbon, hydrogen, and oxygen, and optionally, nitrogen and the halogens. Oxygen and nitrogen atoms are generally present in ether, ester, urethane, amide, and urea groups. The compounds preferably have a number average molecular weight of less than about 4000.

Preferred compounds are esters of aliphatic monohydroxy and polyhydroxy group containing compounds and unsaturated carboxylic acids, such as acrylic acid, methacrylic acid, itaconic acid, crotonic acid, isocrotonic acid, maleic acid, and the like. Representative examples of preferred ethylenically unsaturated compounds include methyl methacrylate, ethyl methacrylate, styrene, divinylbenzene, vinyl toluene, ethylene glycol diacrylate and methacrylate, hexanediol diacrylate, tri- and tetraethylene glycol diacrylate and methacrylate, trimethylolpropane triacrylate, glycerol triacrylate, pentaerythritol triacrylate and methacrylate, pentaerythritol tetraacrylate and methacrylate, dipentaerythritol pentaacrylate, sorbitol triacrylate, sorbitol hexaacrylate, bisphenol A diacrylate, and ethoxylated bisphenol A diacrylate.

Other ethylenically unsaturated compounds useful in the invention include ethylene glycol diitaconate, 1,4-butanediol diitaconate, propylene glycol dicrotonate, dimethyl maleate, and the like. Other ethylenically unsaturated compounds include monoallyl, polyallyl, and polymethallyl esters and amides of carboxylic acids, such as diallyl phthalate, diallyl adipate, and N,N-diallyladipamide. Still other nitrogen-containing compounds include tris(2-acryloyl-oxyethyl)isocyanurate, 1,3,5-tri(2-methacryloxyethyl)-s-triazine, acrylamide, ethacrylamide, N-methylacrylamide, N,N-dimethylacrylamide, N-vinylpyrrolidone, and N-vinylpiperidone. It is preferred that the ethylenically unsaturated compounds be acrylic compounds because of their ready availability and accelerated rate of cure.

The coatable, thermally curable binder precursor solutions of the present invention are primarily cured by heat but radiation energy can be used to effect a partial gelation, depending on whether ethylenically unsaturated compounds are added to accelerate cure.

When the binder precursor solution is cured solely by heat, the temperature of the curing environment should be set to at least about 100° C. and the binder precursor solution held at this temperature for at least about 4 hours. Curing can be effected in shorter times at higher temperatures. In the case of coated and nonwoven abrasives, the curing temperature is limited to the temperature that synthetic or natural backings used in these abrasive products can withstand.

When the binder precursor solution can be partially cured by radiation, the amount of radiation used depends upon the degree of cure desired and the particular monomers used to prepare the binder precursor solution. Examples of radiation energy sources include ionizing radiation, ultraviolet radiation, and visible light radiation. Ionizing radiation, e.g., electron beam radiation, preferably has an energy level of 0.1 to 10 mrad, more preferably 1 to 10 mrad. Ultraviolet radiation is radiation having a wavelength within the range of 200 to 700 nanometers, more preferably between 250 to 400 nanometers. Visible light radiation is radiation having a wavelength within the range of 400 to 800 nanometers, more preferably between 400 to 550 nanometers. The rate of curing with a given level of radiation varies according to the binder thickness, temperature as well as the density and nature of the composition. Ultraviolet radiation is preferred, achieved with a lamp output of about 79 watts/cm. At this output, the binder precursor solutions should be exposed at a rate of about 30 m/min.

A thermal initiator can optionally be added to increase the thermal cure speed. Examples of such thermal initiators include peroxides, e.g., benzoyl peroxide, and azo compounds.

If the coatable, thermally curable binder precursor solution is first partially cured by ultraviolet radiation, a photoinitiator is required to initiate the free-radical polymerization. Examples of such photoinitiators are organic peroxides, azo compounds, quinones, benzophenones, nitroso compounds, acyl halides, hydrazones, mercapto compounds, pyrylium compounds, triacrylimidazoles, bisimidazoles, chloroalkyltriazines, benzoin ethers, benzil ketals, thioxanthones, and acetophenone derivatives. Additional references to free-radical photoinitiator systems for ethylenically-unsaturated compounds are described in U.S. Pat. Nos. 3,887,450; 3,895,949; and 3,775,113. Another good reference to free-radical photoinitiator systems is J. Kosar, *Light-Sensitive Systems*, J. Wiley and Sons, Inc. (1965), especially Chapter 5.

If the coatable, thermally curable binder precursor solution can be cured by visible light radiation, a photoinitiator is required to initiate the free-radical polymerization. Examples of preferred photoinitiators can be found in U.S. Pat. No. 4,735,632.

The coatable, thermally curable binder precursor solutions of the present invention can contain fillers, fibers, lubricants, grinding aids, wetting agents, and minor amounts of other additives such as surfactants, pigments, dyes, coupling agents, plasticizers, and suspending agents. The amounts of these materials are selected to give the properties desired.

ABRASIVE ARTICLES

Figure 1:
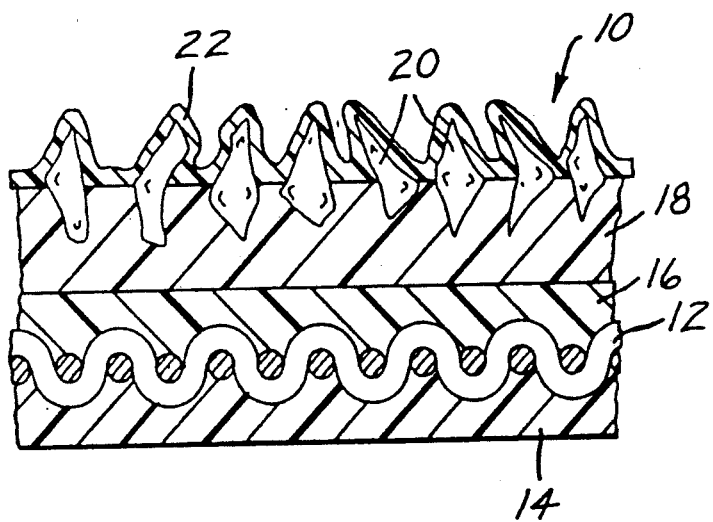

Coated abrasive articles that may be produced by incorporating cured versions of the coatable, thermally curable binder precursor solutions of the invention are illustrated in enlarged cross-section in FIGS. 1 and 2. As illustrated in FIG. 1, the coated abrasive generally indicated as 10 includes a flexible backing 12 such as a paper sheet or cloth fabric which may be treated with an optional saturant coating (not shown), optional backsize coating 14 and/or an optional presize coating 16. Overlaying the presize coating is a make coating 18 in which are embedded abrasive grains 20 such as silicon carbide or aluminum oxide abrasive grains. A size coating 22 has been placed over the make coating 18 and the abrasive grains 20. There is typically no clear line of demarcation between the saturant coating, backsize coating and the presize coating which meet in the interior of the cloth backing which is saturated as much as possible with the resins of these coatings. Typical saturant coatings may include soft acrylics latices, natural rubber, and the thermally curable resins described above. Backsize and presize coatings may also comprise the thermally curable resins described herein.

In FIG. 2 there is illustrated a coated abrasive generally indicated as 30 which is formed on a paper backing 32. Paper backing 32 is treated with a backsize coating 34 and presize coating 36. Presize coating 36 is overcoated with a make coating 38 in which are embedded abrasive grains 40. Abrasive grains 40 and make coating 38 are overcoated with a size coating 42 which aids in holding abrasive grains 40 onto the backing during utilization and further may contain cutting aids.

Figure 3:
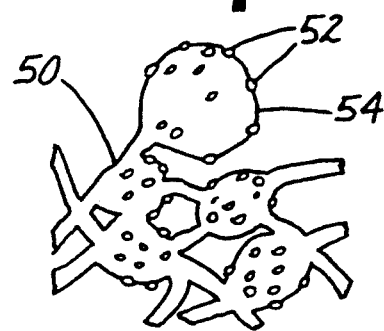
FIG. 3 shows an enlarged schematic view at roughly 100× magnification of a nonwoven abrasive article in accordance with the invention.
Figure 4:
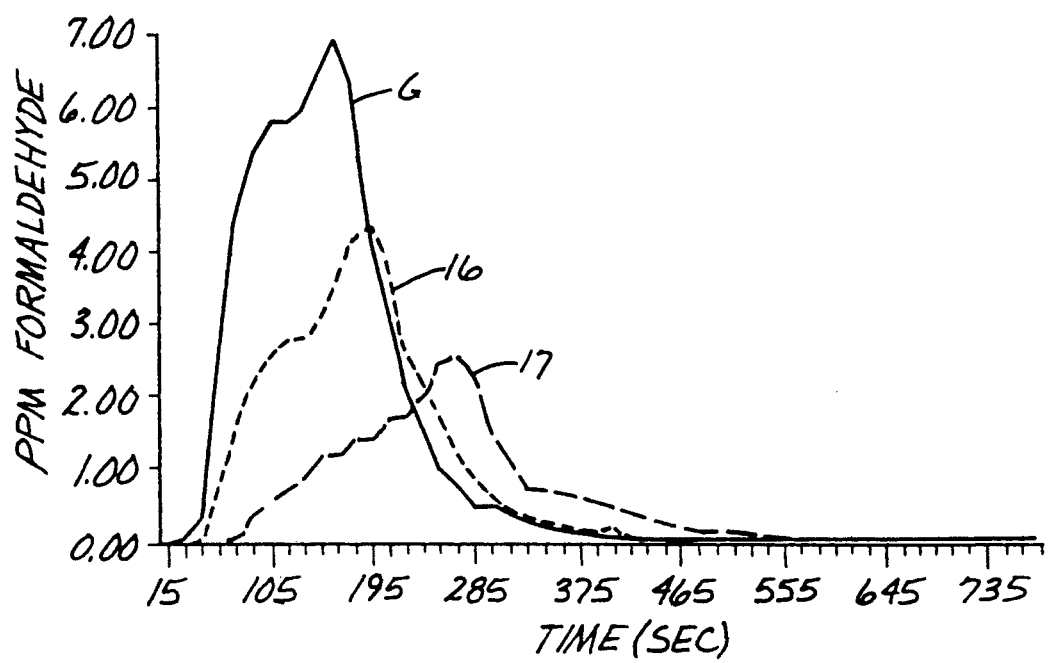
FIG. 4 shows graphically that as the amount of the reactive diluent HEEU in the binder precursor solutions of the present invention increased, the total formaldehyde emission decreased to about 55% of the formaldehyde emitted from an unmodified sample.
Figure 5:
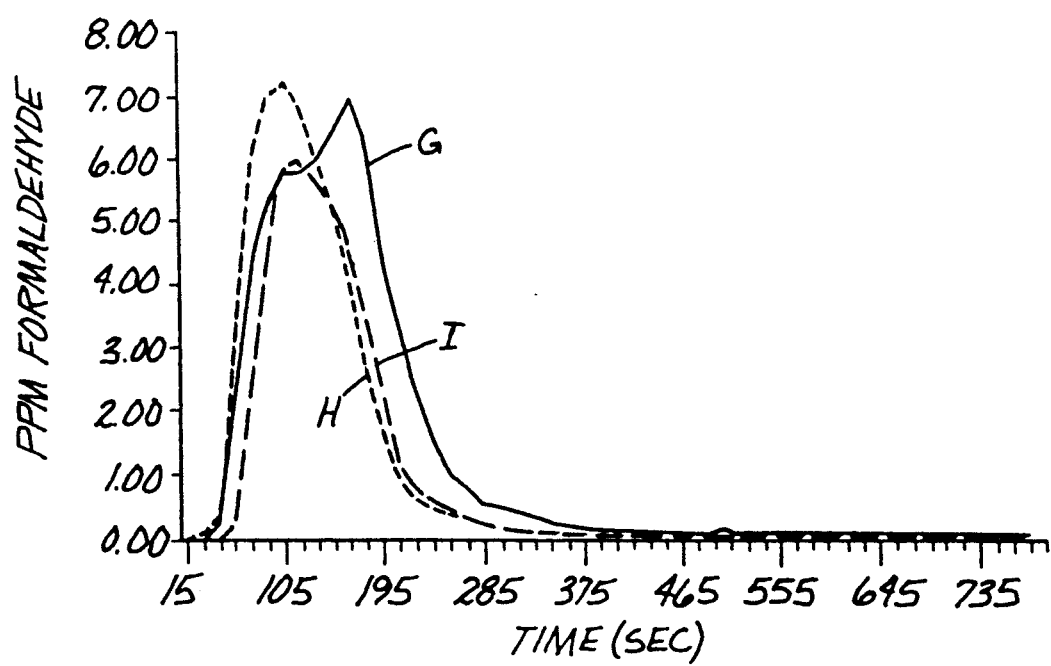
FIG. 5 shows graphically that increasing amounts of alkaline catalyst in the binder precursor solutions of the present invention tended to increase the rate of formaldehyde emission, but cumulative formaldehyde emission was reduced to about 66% of the formaldehyde emitted from an unmodified sample of binder precursor solution including phenol-formaldehyde resin.
Figure 6:
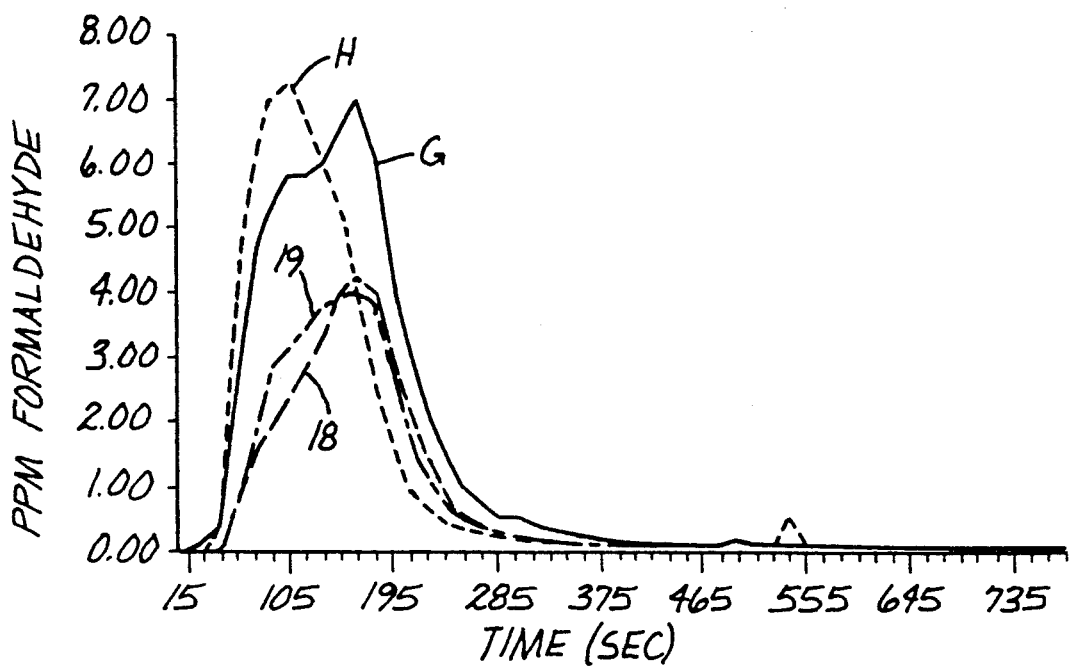
FIGS. 6 and 7 show graphically that combinations of alkaline catalyst and the reactive diluent HEEU in binder precursor solutions of the present invention which included phenol-formaldehyde resins reduced formaldehyde emissions to about 56% and about 46% of the formaldehyde emitted from an unmodified (i.e., without reactive diluent) sample of the same precursor solution.
Figure 7:
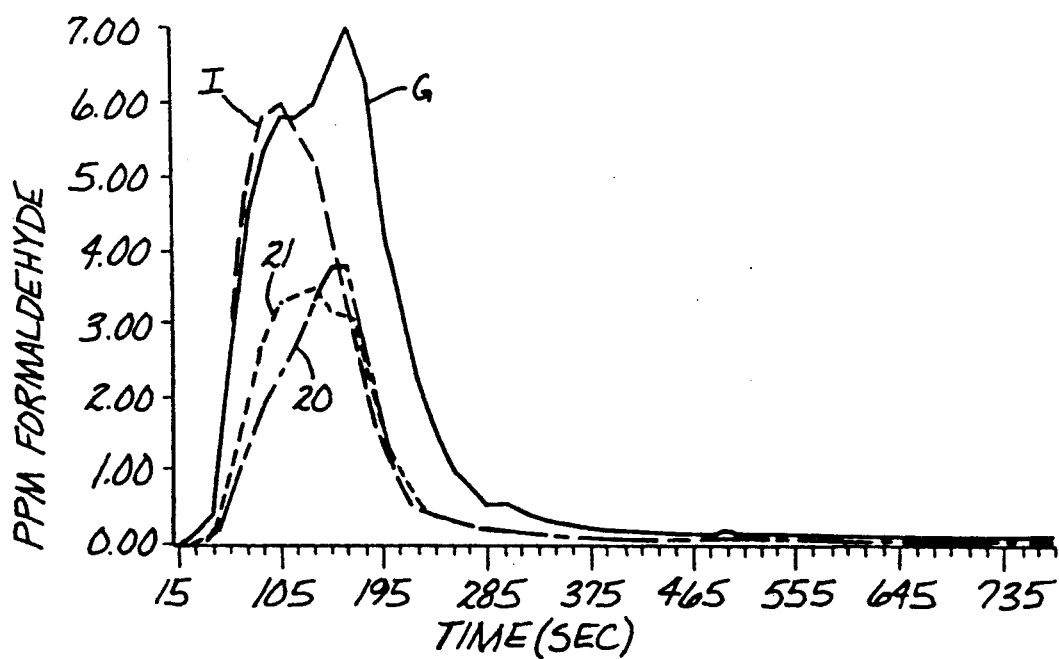

FIG. 3 shows an enlarged schematic view at roughly 100× magnification of one embodiment of a typical nonwoven abrasive article with its three component parts. The fibrous mat 50 is the substrate onto which the abrasive grains 52 are adhered by the resinous binder 54.

In abrasive articles fillers are frequently used to reduce cost and improve dimensional stability and other physical characteristics. Fillers can be selected from any filler material that does not adversely affect the characteristics of the binder. Preferred fillers include calcium carbonate, calcium oxide, calcium metasilicate, aluminum sulfate, alumina trihydrate, cryolite, magnesia, kaolin, quartz, and glass. Fillers that function as grinding aids are cryolite, potassium fluoroborate, feldspar, and sulfur. Fillers can be used in varying amounts limited only by the proviso that the abrasive article retains acceptable mechanical properties (such as flexibility and toughness).

The backing for coated abrasive products can be formed, for example, of paper, cloth, vulcanized fiber, polymeric film, or any other backing material known for use in coated abrasive or treated versions thereof.

The abrasive grains can be of any conventional grade utilized in the formation of coated abrasives and can be formed of, for example, flint, garnet, aluminum oxide, ceramic aluminum oxide, alumina zirconia (including fused alumina zirconia such as disclosed in U.S. Pat. Nos. 3,781,172; 3,891,408; and 3,893,826, commercially available from the Norton Company of Worcester, Mass., under the trade designation "NorZon"), diamond, silicon carbide (including refractory coated silicon carbide such as disclosed in U.S. Pat. No. 4,505,720), alpha alumina-based ceramic material (available from Minnesota Mining and Manufacturing Company under the trade designation "CUBITRON") as disclosed in U.S. Pat. Nos. 4,314,827; 4,518,397; 4,574,003; 4,744,802; and EP Publication 228,856, or mixtures thereof. The abrasive grains can be individual or agglomerated. The frequency concentration of the abrasive grains on the backing is also conventional. The abrasive grains can be oriented or can be applied to the backing without orientation, depending upon the requirements of the particular coated abrasive product.

Coated abrasive articles made in accordance with this invention can also include such modifications as are known in this art. For example, a back coating such as a pressure sensitive adhesive (PSA) can be applied to the non-abrasive side of the backing and various super size coatings, such as zinc stearate, can be applied to the abrasive surface to prevent abrasive loading; alternatively, the super size coating can contain a grinding aid to enhance the abrading characteristics of the coated abrasive, or a release coating to permit easy separation of PSA from the coated abrasive surface.

METHODS OF MAKING ABRASIVE ARTICLES

One advantage of the process of making the abrasive articles of this invention over those previously known is the reduction in VOC emissions by festoon ovens. The inclusion of amine- or urea-terminated reactive diluents in the coatable, thermally curable binder precursor solutions described herein significantly reduces formaldehyde emissions during curing of the binder precursor solutions, and may also increase water tolerance of the uncured binder precursor solution. Careful selection of the thermally curable resin and reactive diluent (use of reactive diluent having molecular weight less than about 1000) will allow coatable viscosities to be obtained with only water as solvent. Organic solvents contributing to atmospheric VOC are then not required for viscosity adjustment.

In the manufacture of coated abrasive articles of the invention, the coatable, thermally curable binder precursor solutions of this invention, when cured, can be used as a treatment coating for the backing, e.g., cloth, paper, or plastic sheeting, to saturate or provide a back coating (backsize coating) or front coating (presize coating) thereto, as a make coating to which abrasive grains are initially anchored, as a size coating for tenaciously holding abrasive grains to the backing, or for any combination of the aforementioned coatings. In addition, the coatable, thermally curable binder precursor solutions of this invention, when cured, can be used in coated abrasive article embodiments where only a single-coating binder is employed, i.e., where a single-coating takes the place of a make coating/size coating combination.

When the coatable, thermally curable binder precursor solutions of the present invention are applied to backing in one or more treatment steps to form a treatment coating, the treatment coating can be cured thermally by passing the treated backing over a heated drum; there is no need to festoon cure the backing in order to set the treatment coating or coatings. After the backing has been properly treated with a treatment coating, the make coating can be applied. After the make coating is applied, the abrasive grains are applied over the make coating. Next, the make coating, now bearing abrasive grains, is exposed to a heat source, and, optionally, to a radiation source, which generally solidifies or sets the binder sufficiently to hold the abrasive grains to the backing. It is preferable to use only the heat source to set the make coating unless ethylenically unsaturated monomers are present. Then the size coating is applied, and the size coating/abrasive grain/make coating combination is exposed to a heat source, preferably via a drum cure. This process will substantially cure or set the make and size coating used in the coated abrasive constructions.

The coatable, thermally curable binder precursor solutions of the present invention, when cured, only need to be in at least one of the binder layers, i.e., treatment coating, make coating, size coating, comprising the coated abrasive article. It does not need to be in every binder layer; the other binder layers can utilize various other binders known in the art, such as epoxy resin-based binders. If the binder of the present invention is in more than one layer, the curing conditions do not need to be the same for curing each layer of the coated abrasive.

It is also contemplated that cured versions of the coatable, thermally curable binder precursor solutions of this invention can be employed as a binder for nonwoven abrasive products. Nonwoven abrasive products typically include an open, porous, lofty, mat of fibers having abrasive grains bonded thereto by a binder. In one preferred embodiment, the method comprises combining a 30-95% solids solution of a thermally curable resin with a reactive diluent, as above described, to form a coatable, thermally curable binder precursor solution, adding abrasive grains to the coatable, thermally curable binder precursor solution, coating the abrasive-filled, coatable, thermally curable binder precursor solution onto at least a portion of the fibers of a lofty, open fibrous mat, and subjecting the resulting structure to conditions sufficient to affect curing of the binder precursor solution, preferably heat. Optionally, additional abrasive grains may be applied prior to curing the binder precursor solution, for example, by electrostatic precipitation or electrospray methods. A suitable electrospray coating process is described in U.S. Pat. No. 4,748,043, incorporated by reference herein.

Cured binder precursors of this invention can also be used to make bonded abrasive products. Bonded abrasive products typically consist of a shaped mass of individual or agglomerated abrasive grains held together by an organic or ceramic binder material. The shaped, cured mass is preferably in the form of a grinding wheel. However, it is not necessary to place the binder precursor solution and abrasive grains into a mold prior to curing the binder precursor. For example, the binder precursor and abrasive grains may be poured onto a surface and cured into a flat sheet of bonded abrasive.

TEST METHODS

The following test methods were used to characterize the solutions and articles of the invention.

Water Tolerance: The amount of water (percent by weight of resin) a phenolic resin will tolerate before phase separation serves as an indicator as to how much water may be added as solvent and how far the resin has advanced in molecular weight. A 50.0 gram sample of resin to be tested was brought to 25° C. in a 250 ml breaker placed on a balance. With the sample mixing via a magnetic stirrer, small increments of distilled water were added, allowing the resin to mix with the water after each water addition until a homogeneous mixture was reached. The endpoint occurred when the resin/water solution began to turn permanently milky in appearance; i.e., when the water and resin could not be mixed without a milky appearance remaining after thorough stirring. After the endpoint was reached, the beaker and contents were weighed, and water tolerance = $(A-B) \times 100\%$, where A = final weight of beaker contents, B = weight of resin (initial).

Gel Time: Gel time gives an indirect measurement of the degree of polymerization for phenolic resins at a particular catalyst level. The lower the gel time the more advanced in molecular weight the resin is considered to be. A commercially available gel time apparatus known by the trade designation "Sunshine Gelmeter", available from Sunshine Co., was used in each measurement. This gel time measuring apparatus is a torsion apparatus, wherein a glass rod (168 mm long by 6.35 mm diameter) is attached at one end via a chuck to a torsion wire (0.254 mm diameter music wire, available from Sunshine Co.), with the torsion wire in turn attached to a drive mechanism via a magnetic coupling so that the wire/glass rod combination hang vertically from the drive mechanism. About 2.81 cm of wire existed between the chuck and the magnetic coupling. A test tube (150 × 18 mm) was filled to about 65 mm depth with the resin to be tested (originally at 25° C. ± 3° C.), and the tube placed in a boiling water bath. The glass rod was lowered into the resin with the lower end of the glass rod about 6.35 mm from the tube bottom, and so that the resin level in the tube was below the water bath level. The glass rod/torsion wire were then rotated in the bath by the drive mechanism. As this combination was rotated a projection extending from the chuck connecting the glass rod and torsion wire also rotated, finally touching a similar, stationary projection extending from the machine. The gap between the projections was originally set at 2.38 mm for each test. The time required for the rotating projection to touch the stationary projection was recorded as the gel time for each resin.

Micro Vickers Hardness: A hardness tester known under the trade designation "Leitz-Micro-Hardness" tester was employed for all hardness measurements. The test procedure is described in ASTM E-92-82 (Reapproved 1987), incorporated herein by reference. A load of 50 grams was applied for 30 seconds in each case to achieve the required indentation.

Machine Direction (MD) and Cross Direction (CD) Tensile Tests: In each case these tests were performed in accordance with ASTM D1682, method 2C-T, incorporated herein by reference.

Wet Schiefer Test: This test provided a measure of the cut (material removed from a workpiece) and finish (the relative quality of the abraded surface) of coated abrasive articles under wet conditions. A 10.16 cm diameter circular specimen was cut from the abrasive material tested and secured by a pressure-sensitive adhesive to a back-up pad that had been pre-conditioned by soaking in water. The abrasive material was then pre-wetted by floating in water. The back-up pad was secured to the driven plate of a Shiefer Abrasion Tester (available from Frazier Precision Company, Gaithersburg, Md.) which had been plumbed for wet testing. A circular acrylic plastic workpiece, 10.16 cm diameter by 1.27 cm thick, available under the trade designation "POLYCAST" acrylic plastic from Seelye Plastics, Bloomington, Minn. was employed. The initial weight of each workpiece was recorded to the nearest milligram prior to mounting on the workpiece holder of the abrasion tester. The water drip rate was set to 60 (+/−6 grams) per minute. A 4.55 kg load was placed on the abrasion tester weight platform and the mounted abrasive specimen was lowered onto the workpiece. The machine was set to run for 500 cycles and then automatically stop. After each 500 cycles of the test, the workpiece was wiped free of water and debris and weighed. The cumulative cut for each 500-cycle test was the difference between the initial weight and the weight following each test.

If the finish of the workpiece was determined, the abraded workpiece was mounted in the specimen holder of a "Rank Surtronic 3" profilometer, available from Rank Taylor-Hobson, Leicester, England, and the surface profile measured. $R_{tm}$, which is the mean of the maximum peak-to-valley values from each of 5 sampling lengths, was recorded for each test.

MATERIALS

The following materials were used as described in the examples (quotation marks indicate trade designations):

The chemical known under the trade designation "EPON 871" is an epoxy resin, available from Shell Chemical Company, Houston, Tex.;

The chemical known under the trade designation "EPON 828" is an epoxy resin, available from Shell Chemical Company, Houston, Tex.;

The chemical known under the trade designation "VERSAMIDE 125" is a polyamide curing agent, available from Henkel Corporation, Kankakee, Ill.;

The chemical known under the trade designation "MODAFLOW" is a resin diluent, available from Monsanto Company, St. Louis, Mo.;

The chemical known under the trade designation "A-1100" is a silane coupling agent, available from Union Carbide Chemicals and Plastics Company, Inc., Danbury, Conn.;

The chemical known under the trade designation "AROMATIC 100" is a solvent naphtha, available from Worum Chemical Company, St. Paul, Minn.;

The chemical known under the trade designation "SILWET L-7604" is a surfactant, available from Union Carbide Chemicals and Plastics Company, Inc., Danbury, Conn.;

The chemical known under the trade designation "INTERWET" is a nonionic surfactant, available from Interstab Chemicals, New Brunswick, N.J.;

The chemicals known under the trade designations "EDR-148", "D-230", and "ED-600" are poly(oxyalkylene) diamines available under the general trade designation "JEFFAMINE", from Texaco Chemical Company, Houston, Tex., with the numerical notation designating the approximate molecular weight of the compounds;

Grade 1200 silicon carbide abrasive grains, available from Nanko Abrasive Industry Company, Ltd., Tokyo, Japan;

Grade P-400 aluminum oxide abrasive grains, available under the trade designation "ALODUR FRPL" from Treibacher, Treibach, Austria;

DGMA is a diethylene glycol - maleic anhydride polyester plasticizer;

"A" weight paper is a paper weighing 110 g/m² with a latex barrier coat to allow topical application of a make coating resin;

The chemical known under the trade designation "Irgacure 651" is a free radical initiator, available from Ciba-Geigy Corp., Greensboro, N.C.; and "PETA" is a pentaerythritol triacrylate monomer, available from Sartomer Co. Inc., Exton, Pa.

"Hi-Sol 10" is a naphtha-base solvent available from Ashland Oil, Inc. Columbus, Ohio.

"Versacure 125 SC85" is a curing agent available from Henkel Corporation, Minneapolis, Minn.

EXAMPLES

The following non-limiting examples will further illustrate the present invention. All coating weights are specified in grams/square meter (g/m²). All resin formulation ratios and percentages are based upon weight, and the weight ratio of formaldehyde to phenol in the phenolic resin used to make the coatable, thermally curable binder precursors was 1.96:1 (standard phenolic resin available from Reichold Chemical, which includes about 2% KOH as catalyst based on weight of phenol) unless otherwise specified. The standard resin was also 70% solids unless otherwise specified, while HEEU reactive diluent was 75% solids.

COMPARATIVE EXAMPLES A-C AND EXAMPLES 1-6

The effects of added alkaline catalyst and various percentages of reactive diluent were demonstrated in Comparative Examples A-C and Examples 1-6. While alkaline catalysts are known to increase the water tolerance of phenolic resins, they also result in the cured binder having greater sensitivity to water, resulting in binders that undergo larger physical changes with changes in operating conditions, such as ambient humidity.

COMPARATIVE EXAMPLES A-C

Three standard phenol-formaldehyde phenolic resins (as mentioned above) were prepared with varying amounts of additional alkaline catalyst (50% by weight NaOH solution in water). Examples A, B, and C had additional 0, 1.6, and 3.2 parts of 50% NaOH, respectively, and no reactive diluent. The three resins were cured at 110° C. for about 18 hours. Water tolerance and gel time of the uncured resins, and Micro Vickers Hardness values (dry and wet) of cured resins were determined as shown in Tables 1, 2, and 3.

EXAMPLES 1-6

Six standard phenol-formaldehyde phenolic resins were made as in Examples A-C except the reactive diluent HEEU was added in varying amounts. Examples 1-6 were also cured at 110° C. for about 18 hours.

Water tolerance and gel time of the uncured resins, and Micro Vickers Hardness values (dry, wet) were determined as shown in Tables 1, 2, and 3.

As can be seen by the comparative data of Tables 1, 2, and 3, the standard phenolic resin, when modified with HEEU reactive diluent, exhibited much higher water tolerance than the standard resin, and with increased use of alkaline catalyst, gave comparable gel times and hardness values.

TABLE 1

| | Water Tolerance, % | | |
|---|---|---|---|
| Catalyst (as 50% solution), Parts | Comparative Examples A-C 100% Phenolic Resin (Standard) | Examples 1-3 (100 parts Phenolic Resin with 10 parts HEEU) | Examples 4-6 (100 parts Phenolic Resin with 15 parts HEEU) |
| 0 | 53.2 | 73.6 | 91 |
| 1.6 | 101 | 177 | 218 |
| 3.2 | 166 | 259 | 317 |

TABLE 2

| | Gel Time, minutes @ 100° C. | | |
|---|---|---|---|
| Catalyst (as 50% solution), Parts | Comparative Examples A-C 100% Phenolic Resin (Standard) | Examples 1-3 (100 parts Phenolic Resin with 10 parts HEEU) | Examples 4-6 (100 parts Phenolic Resin with 15 parts HEEU) |
| 0 | 37.6 | 50 | 60 |
| 1.6 | 30 | 40.2 | 46.6 |
| 3.2 | 27.6 | 36.8 | 42.8 |

TABLE 3

| | Micro Vickers Hardness (Dry, Wet) in GPa | | |
|---|---|---|---|
| Catalyst (as 50% solution), Parts | Comparative Examples A-C 100% Phenolic Resin (Standard) | Examples 1-3 (100 parts Phenolic Resin with 10 parts HEEU) | Examples 4-6 (100 parts Phenolic Resin with 15 parts HEEU) |
| 0 | 0.567, 0.492 | 0.500, 0.437 | 0.512, 0.376 |
| 1.6 | 0.628, 0.509 | 0.567, 0.494 | 0.533, 0.378 |
| 3.2 | 0.710, 0.478 | 0.604, 0.435 | 0.570, 0.404 |

COMPARATIVE EXAMPLE D AND EXAMPLES 7-9

Comparative Example D and Examples 7-9 demonstrated that the standard phenol-formaldehyde phenolic resin modified with the reactive diluent HEEU retained the reactive diluent during and after curing.

COMPARATIVE EXAMPLE D

A standard phenol-formaldehyde phenolic resin (i.e., without reactive diluent) was prepared as in Examples A-C, the only differences being in cure time and temperature. Example D was cured at 105° C. for 18 hours, weighed, and further heated at 176° C. for 20 hours and weighed again. The theoretical and actual sample weights are shown in Table 4.

EXAMPLES 7-9

Three modified standard phenolic resin samples in accordance with the present invention (Examples 7-9) were prepared with varying amounts of the reactive diluent HEEU. No alkaline catalyst was added. The samples were cured at 105° C. for 18 hours weighed, then additionally heated at 176° C. for 20 hours, and weighed again, exactly as in Example D. Theoretical and actual sample weights for Examples 7-9 are shown in Table 4.

TABLE 4

| Component | Comparative Example D | Example 7 | Example 8 | Example 9 |
|---|---|---|---|---|
| Phenolic Resin (70 ± 2% solids) | 36.62 | 36.60 | 36.58 | 36.60 |
| HEEU (75% solids) | 0 | 9.65 | 6.32 | 3.82 |
| Aliquot wt., g | 7.39 | 6.15 | 8.17 | 7.70 |
| Theoretical Dry wt., g | 5.17 | 4.37 | 5.78 | 5.44 |
| Wt. after 18 h @ 105° C. | 5.53 | 4.47 | 6.13 | 6.29 |
| Wt. after 20 h @ 176° C. | 5.16 | 4.21 | 5.66 | 5.35 |

COMPARATIVE EXAMPLE E AND EXAMPLES 10-12 (NONWOVEN ABRASIVES)

Four nonwoven fabrics comprising 126 grams/m$^2$ of 15 denier, 3.81 cm nylon 6,6 staple fiber (available under the trade designation "Type 101 Bright" from E. I. du Pont de Nemours & Company, Incorporated, Wilmington, Del.) were roll-coated with standard (Example E) and modified (Examples 10-12) mixes as shown in Table 5. Resin add-on weight was about 84 grams/m$^2$ in each of Examples E and 10-12. Water was left out of the formulations of Examples E and 10-12 because the reactive diluent HEEU significantly lowered the viscosity of the mixes. The coated fabrics of Examples E and 10-12 were dried and cured in a 4.6-meter continuous flow oven at 150° C. and 1.5 meters/minute, and post-cured in a stationary oven at 135° C. for 30 minutes. It can be seen by the tensile strength data in Table 6 that a higher amount of HEEU was detrimental to the tensile strength of the coated fabric of Examples 10 and 11 but there are very useful ranges within which to operate.

TABLE 5

| Component, parts | Comparative Example E | Example 10 | Example 11 | Example 12 |
|---|---|---|---|---|
| HEEU | 0 | 21.60 | 17.90 | 14.30 |
| Isopropanol | 41.46 | 0 | 0 | 0 |
| Standard Phenolic Resin | 36.58 | 36.58 | 36.58 | 36.58 |
| Red Dye Mix | 8.94 | 8.94 | 8.94 | 8.94 |
| polyamine flexibilizer ("EPICURE") | 13.01 | 0 | 0 | 0 |
| silicone antifoam chemical ("Q2", Dow Chemical Company, Midland, MI) | 0.009 | 0.009 | 0.009 | 0.009 |

TABLE 6

| Avg Tensile Breaking Load kg/50.8 mm width | Comparative Example E | Example 10 | Example 11 | Example 12 |
|---|---|---|---|---|
| MD* | 12.45 | 4.95 | 8.73 | 12.23 |

TABLE 6-continued

| Avg Tensile Breaking Load kg/50.8 mm width | Comparative Example E | Example 10 | Example 11 | Example 12 |
|---|---|---|---|---|
| CD** | 11.95 | 4.68 | 9.45 | 11.05 |

*MD is machine direction (down web)
**CD is cross-web direction

COMPARATIVE EXAMPLE F AND EXAMPLES 13–15 (NONWOVEN ABRASIVES)

Four examples of a nonwoven abrasive material were made, one with the same standard phenol-formaldehyde resin as used in the previous examples and three with the modified binder precursors of this invention, as shown in Tables 7, 8, and 9. The fibrous mat Was 13.5 denier, 3.81 cm high-tenacity nylon 6,6 staple (available from E. I. du Pont de Nemours & Company, Incorporated, Wilmington, Del. under the trade designation "Type P-85"). A prebond coating (Table 8) was applied by a roll coater, dried, and cured at about 175° C. for about 10 minutes. A make coating in the form of a spray containing $Al_2O_3$ abrasive grains (Table 9) was then applied by a spray coater, dried, and cured at about 175° C. for about 10 minutes. Half of each prebond coated fabric was coated with each of the make coating mixes so that four examples resulted: one which was all standard resin (Example F), one that had both prebond and make coating "modified", Example 13, and two that were combinations of the two resin systems (Examples 14, 15) as shown in Tables 8 and 9. Tensile strength of the resulting nonwoven abrasives were measured in both the MD and CD and reported in Table 10.

TABLE 7

| Coating Step | Comparative Example F | Example 13 | Example 14 | Example 15 |
|---|---|---|---|---|
| Prebond | Standard | Standard | Modified | Modified |
| Spray Coating | Standard | Modified | Standard | Modified |

TABLE 8

| Prebond Composition | | |
|---|---|---|
| Component | Standard, parts | Modified, parts |
| Water | 0 | 0 |
| HEEU | 0 | 1.43 |
| Isopropanol | 1.50 | 0 |
| Standard Phenolic Resin | 3.66 | 3.66 |
| Red Dye Mix | 0.894 | 0.894 |
| polyamine flexibilizer ("EPICURE") | 1.31 | 0 |
| silicone antifoam ("Q2") | 0.009 | 0.009 |

TABLE 9

| Spray Coating Composition | | |
|---|---|---|
| Component | Standard, parts | Modified, parts |
| Water | 0 | 0.764 |
| HEEU | 0 | 1.96 |
| Phenolic Resin | 5.186 | 5.186 |
| diethylene glycol ethyl ether solvent ("Carbitol") | 3.860 | 0 |
| Red Dye Mix | 0.554 | 0.554 |
| 280 micrometer average grain size $Al_2O_3$ (abrasive grains) | 10.000 | 10.000 |

TABLE 10

| | Tensile Strength | | | |
|---|---|---|---|---|
| Avg. Tensile Breaking Load kg/50.8 mm width | Comparative Example F | Example 13 | Example 14 | Example 15 |
| MD | 15.59 | 13.77 | 15.36 | 16.64 |
| CD | 15.14 | 16.82 | 15.32 | 17.00 |

COMPARATIVE EXAMPLES G–I AND EXAMPLES 16–21 (FORMALDEHYDE EMISSIONS)

Comparative Examples G–I and Examples 16–21 were prepared from a 1.96:1.0 formaldehyde/phenol ratio phenolic resin which contained no organic solvent and was 75% solids. (This was a precursor product to the "standard" resin, which was obtained from the manufacturer, Reichold Chemicals, prior to dilution to 70% solids.) These examples further demonstrated the ability of the binder precursors of this invention to allow the use of less organic solvents in the manufacture of abrasive articles. Additionally, these examples demonstrated the ability of the modified binder precursors of this invention to suppress emission of formaldehyde during manufacturing of abrasive articles. Table 11 shows the composition of Examples G–I and 16–21. Water Tolerance and Gel Time responses were determined for each example resin mix. These data are shown in Table 12.

In order to demonstrate the reduction in formaldehyde emissions in the practice of this invention, 2.0 gram samples of each of Comparative Examples G, H, and I, and Examples 16 through 21 were placed in an oven at 150° C. for 13 minutes. A formaldehyde detector known under the trade name "Interscan" (Model #1160, available from Interscan Corporation) was used to measure the formaldehyde release, with results shown in Table 13 and FIGS. 4–7. The relative formaldehyde release for Examples G–I and 16–21 were determined by making copies of the Figures, cutting out the areas under the respective curves, measuring the weight of paper cut-outs of the areas beneath the respective curves of ppm formaldehyde released vs. time, and comparing the weight of the individual paper cut-outs to the weight of the cut-out for Example G.

TABLE 11

| Example Designation | Phenolic Resin, parts (75% solids) | HEEU, parts | Alkaline Catalyst as 50% NaOH, parts |
|---|---|---|---|
| Comparative Example G | 100 | 0 | 0 |
| Comparative Example H | 100 | 0 | 1.6 |
| Comparative Example I | 100 | 0 | 3.2 |
| Example 16 | 91 | 9 | 0 |
| Example 17 | 87 | 13 | 0 |
| Example 18 | 91 | 9 | 1.6 |
| Example 19 | 87 | 13 | 1.6 |
| Example 20 | 91 | 9 | 3.2 |
| Example 21 | 87 | 13 | 3.2 |

TABLE 12

| Example Designation | Water Tolerance, % | Gel Time, minutes |
|---|---|---|
| Comparative Example G | 29 | 37 |
| Comparative Example H | 116 | 28 |
| Comparative Example I | 163 | 25 |
| Example 16 | 69 | 48 |
| Example 17 | 84 | 57 |
| Example 18 | 180 | 37 |
| Example 19 | 197 | 41 |
| Example 20 | 255 | 33 |
| Example 21 | 276 | 38 |

TABLE 13

| Example Designation | Relative Formaldehyde Emissions in 13 Minutes |
|---|---|
| Comparative Example G | 100 |
| Comparative Example H | 81 |
| Comparative Example I | 67 |
| Example 16 | 65 |
| Example 17 | 45 |
| Example 18 | 58 |
| Example 19 | 51 |
| Example 20 | 45 |
| Example 21 | 42 |

COMPARATIVE EXAMPLE J AND EXAMPLES 22-25 (BIS-PHENOL A/FORMALDEHYDE)

The particular resins of Examples J and 22-25 were bis-phenol A/formaldehyde condensates of 3.5 moles of formaldehyde per mole bis-A. These mixtures were not further condensed. The affect of HEEU on the water tolerance of these condensates was tested. The condensate/HEEU mixtures were very viscous and somewhat difficult to measure water tolerance on but the results were very encouraging and show the breadth of applicability to materials other than standard phenol/formaldehyde resole phenolics. The compositions are shown below in Table 14. In all cases 100 grams of the bis-phenol A material was used. Increasing quantities of HEEU were employed as shown.

TABLE 14

| Example | HEEU (grams) | Water Tolerance % |
|---|---|---|
| Comparative Example J | 0.0 | 250 (estimated by extrapolation) |
| 22 | 10.0 | 308 |
| 23 | 15.0 | 358 |
| 24 | 20.0 | 376 |
| 25 | 25.0 | 396 |

COMPARATIVE EXAMPLE K AND EXAMPLES 26-30 (COATED ABRASIVES, ABRADING PERFORMANCE)

Examples 26-30 and Comparative Example K compared the abrading performance of coated abrasives made using the preferred reactive diluent HEEU with the standard resole phenolic resin. Binder precursor solutions were prepared using the ingredients shown in Table 15.

TABLE 15

| Component | Resin Compositions (parts) | | | | |
| | Control Make | Control Size | Exp. Make A | Exp. Make B | Exp. Size |
|---|---|---|---|---|---|
| Phenolic Resin, 76% solids* | 83.36 | 38.48 | 76.85 | 75.99 | 40.47 |
| Formaldehyde, | 1.73 | 0 | 0.91 | 0 | 0 |
| NaOH, 50% by wt.* | 0 | 0 | 1.13 | 1.22 | 0.65 |
| 2-ethoxyethanol | 7.45 | 7.64 | 0 | 0 | 0 |
| Water | 7.46 | 7.64 | 14.07 | 15.20 | 13.60 |
| HEEU, 75% solids* | 0 | 0 | 7.04 | 7.60 | 4.05 |
| Pigment, 50%* | 0 | 14.96 | 0 | 0 | 13.35 |
| Ca(SO$_4$)$_2$** | 0 | 31.28 | 0 | 0 | 27.88 |

*Balance water
**Filler

TABLE 16

| Example | Make Resin | Size Resin |
|---|---|---|
| Comparative Example K | Control | Control |
| 26 | Control | Expmt Size |
| 27 | Expmt Make A | Control |
| 28 | Expmt Make A | Expmt Size |
| 29 | Expmt Make B | Control |
| 30 | Expmt Make B | Expmt Size |

Examples K and 26-30 were prepared with control make and size coatings as shown in Table 16. The control phenolic resin used was the same as that used in Examples G-I and 16-21. The backing for Examples K and 26-30 was an X-weight woven cotton backing with a four-over-one weave. The backing had a saturant treatment and a backsize treatment. The make coatings were applied to achieve a (dry) coating weight of about 79 g/m$^2$. Grade 80 aluminum oxide abrasive grains were applied to achieve a dry add-on weight of about 250 g/m$^2$. The compositions were then cured for 30 minutes at 115° C. The size coatings were then applied to achieve a dry add-on weight of about 113 g/m$^2$. These compositions were then cured for 76 minutes at about 100° C. The cure was completed by curing at 100° C. for 10 hours. The resulting coated abrasive materials were then flexed by hand and tested according to the following methods:

The products of Examples K and 26-30 were tested by two methods. First, tests were performed on a tensile tester known under the trade name "SINTECH". This test was designed to measure the force needed to remove the backing from the abrasive layer by a 90° peel test, i.e., where the backing and abrasive layer are at a 90° angle when separated by pulling. Test specimens were prepared by securing a 7.6 cm × 30 cm sample of coated abrasive material, abrasive side down, to a 15.2 cm × 7.6 cm × 0.8 cm basswood board with an isooctylacrylate/acrylic acid hot-melt adhesive so that the abrasive layer was held to the basswood board. The long dimension of each of the coated abrasives was in the warp direction of the backing fabric. After the adhesive had cooled to ambient temperature, the specimens were conditioned to 60% Relative Humidity for at least 24 hours. Following conditioning, the specimens were trimmed to a 5 cm width and the backing separated at one end from the layer comprising the make coating, abrasive grains, and size coating using the tensile tester machine. The backing was secured in the upper jaw of the tensile testing machine and the board installed horizontally in the opposite jaw so that the machine peeled the backing away from the secured abrasive layer at a 90° angle. The tensile tests were conducted at 2.5 cm/min and the load was continuously recorded. The average force required to remove the backing from the abrasive layer is reported in kg per cm of width in Table 17. The average values were only slightly less than comparative Example K, which was used as a control, and the variability within the tests was considered insignificant.

Abrading performance studies were also performed using the products of Examples K and 26-30. The grinding test was used as a measure of the ability of the coated abrasives to effectively remove material from test workpieces. An endless belt of dimensions 7.6 cm wide × 335 cm in circumference was constructed from each of the coated abrasive materials of Examples K and 26-30. Each belt was mounted on a belt grinder with a serrated (1:1, 1.3 cm) 35.6 cm diameter contact wheel of hardness 60A Durometer. Each belt was driven at a rate of 1950 surface meters per minute (no load) and imposed against a 7.8 cm × 2.5 cm × 5 cm (1 × w × h) workpiece at a load of 6.8 kg in one minute cycles with an oscillation rate of about 6 meters per minute. The beginning and ending weight of the workpiece was recorded after each one minute interval for ten minutes. In order to minimize the effects of frictional heating, the workpiece was replaced after each minute of test. Each belt was tested with both 4150 mild steel and 17-4 stainless steel workpieces. The results shown in Tables 18 and 19.

TABLE 17

| Example | 90° Peel Average Force, kg/cm |
| --- | --- |
| Comparative Example K | 2.8 |
| Example 26 | 2.6 |
| Example 27 | 2.6 |
| Example 28 | 2.6 |
| Example 29 | 2.6 |
| Example 30 | 2.7 |

TABLE 18

Sanding Belt Test Results on 4150 steel (grams cut)

| Ex. | grams cut per 1 minute interval. | | | | | | | | | | Total Cut |
| --- | --- | --- | --- | --- | --- | --- | --- | --- | --- | --- | --- |
| | 1 | 2 | 3 | 4 | 5 | 6 | 7 | 8 | 9 | 10 | |
| K | 28 | 24 | 21 | 21 | 19 | 18 | 18 | 17 | 16 | 16 | 188 |
| 26 | 26 | 22 | 20 | 19 | 18 | 17 | 16 | 16 | 15 | 15 | 176 |
| 27 | 26 | 22 | 20 | 22 | 18 | 18 | 17 | 16 | 16 | 16 | 189 |
| 28 | 26 | 20 | 22 | 19 | 18 | 18 | 17 | 16 | 15 | 15 | 184 |
| 29 | 27 | 22 | 20 | 21 | 18 | 19 | 18 | 16 | 16 | 16 | 193 |
| 30 | 26 | 22 | 20 | 19 | 18 | 16 | 17 | 17 | 14 | 16 | 185 |

TABLE 19

Sanding Belt Test Results on 17-4 stainless steel (grams cut)

| Ex. | grams cut per 1 minute interval. | | | | | | | | | | Total Cut |
| --- | --- | --- | --- | --- | --- | --- | --- | --- | --- | --- | --- |
| | 1 | 2 | 3 | 4 | 5 | 6 | 7 | 8 | 9 | 10 | |
| K | 21 | 17 | 15 | 11 | 10 | 19 | 9 | 8 | 7 | 7 | 189 |
| 26 | 21 | 14 | 14 | 10 | 8 | 8 | 8 | 7 | 7 | 7 | 104 |
| 27 | 22 | 15 | 14 | 10 | 9 | 8 | 8 | 8 | 9 | 9 | 110 |
| 28 | 20 | 14 | 14 | 10 | 8 | 8 | 7 | 9 | 7 | 6 | 102 |
| 29 | 21 | 14 | 14 | 10 | 10 | 9 | 9 | 9 | 9 | 7 | 112 |
| 30 | 20 | 15 | 14 | 10 | 9 | 9 | 8 | 8 | 7 | 6 | 106 |

EXAMPLE 31

Making of a Coated Abrasive Utilizing Resole Phenolic Resin, an Ethylenically Unsaturated Monomer, and Reactive Diluent, and Abrading Performance of Same A coated abrasive was made having an A weight waterproof abrasive paper backing, available from Kimberly-Clark Corporation, Roswell, Ga., and utilizing grade 1200 (JIS standard average particle size of 9.5 micrometers) silicon carbide abrasive grains. Make and size coatings were utilized having the compositions listed in Table 20.

The viscosity of the make resin (78% solids as diluted with water) was measured to be 225 cps, while the size resin (60% solids after dilution with "Hi-Sol 10") was measured to be 50 cps, viscosity being measured in each case using a Brookfield viscometer, number 2 spindle at 60 rpm, and at 25° C. for the make resin, 30° C. for size resin. In making the make coating, the ingredients were mixed in their order of appearance in Table 20, followed by dilution with water. In producing the size coating, the wetting agent and solvent were thoroughly mixed with the epoxy resin prior to the addition of the curing agent and "Hi-Sol 10".

For this example, the make coating was applied to achieve a weight of 10.5 g/m$^2$ using a roll-coater, then exposed to ultraviolet radiation using a lamp output of 118 watts/cm, and an exposure rate of 30.5 meters per minute, to partially gel the make coating. The silicon carbide abrasive grains were then electrostatically precipitated onto the make-coated paper backing. The partially gelled make coated, abrasive grain coated backing was heated to 115° C. for 30 minutes to partially cure the make coating. The size coating was then applied over the partially cured make coating to achieve a weight of 12.5 g/m$^2$ using a roll-coater. This structure was then heated to 115° C. for an additional 70 minutes to fully cure the make and size coatings.

An abrading performance test was performed using a standardized abrasive test machine known under the trade designation "Schiefer". The coated abrasive made above, when fully cured, was cut into a 10.2 cm disc, secured to a foam backup pad with a pressure sensitive adhesive, and attached to the machine. In the test, a workpiece was rotated while being forced against the stationary coated abrasive. A test workpiece was weighed initially and after 500 cycle intervals of rotation to determine cumulative weight loss in grams of the workpiece. The workpiece in this case was a 10.2 cm diameter polymethyl-methacrylate disc which was made to simulate a painted surface. Cumulative cut rate is shown in Table 21.

For comparison, a control having the same abrasive grains and size coating was prepared.

The make coating for the control contained 44.8% epoxy resin ("Epon 871"), 22.6% of a 85%/15% solution of curing agent/solvent ("Versacure"/"Hi-Sol 10"), 0.4% wetting agent solution (10% rheology diluent "Modaflow", 90% solvent "Hi-Sol 10"), and 32.2% solvent ("Hi-Sol 10"). A cumulative cut of only 1.9 grams after 2500 cycles of the test machine ("Schiefer") was achieved.

TABLE 20
(Example 31)

| Make Coating Composition (Wt. %) | Size Coating Composition (Wt. %) |
|---|---|
| standard phenolic resin (43%) | epoxy resin (trade designation "Epon 828") (35%) |
| tetraethylene/glycol diacrylate (32%) | polyamide curing agent (trade designation "Versacure 125 SC85") (41.2%) |
| polyethylene glycol (m. wt. = 600) (20%) | |
| curing agent (trade designation "Irgacure 651") (1.5%) | solvent (trade designation "Hi-Sol 10") (23.3%) |
| wetting agent (trade designation "Silwet L-7604") (0.25%) | wetting agent (10% solution of "Modaflow" in "Hi-Sol 10" solvent) (0.5%) |
| wetting agent (trade designation "Interwet") (0.25%) | |
| reactive diluent HEEU (trade designation "UCAR RD-65-2") (3.0%) | |

TABLE 21

| Abrading Performance | |
|---|---|
| Cycles | Cumulative Cut (g) |
| 500 | 0.7 |
| 1000 | 1.3 |
| 1500 | 1.8 |
| 2000 | 2.2 |
| 2500 | 2.5 |

COMPARATIVE EXAMPLES L AND M AND EXAMPLES 32–37 (FURTHER FORMALDEHYDE EMISSION EXAMPLES)

Figure 8:
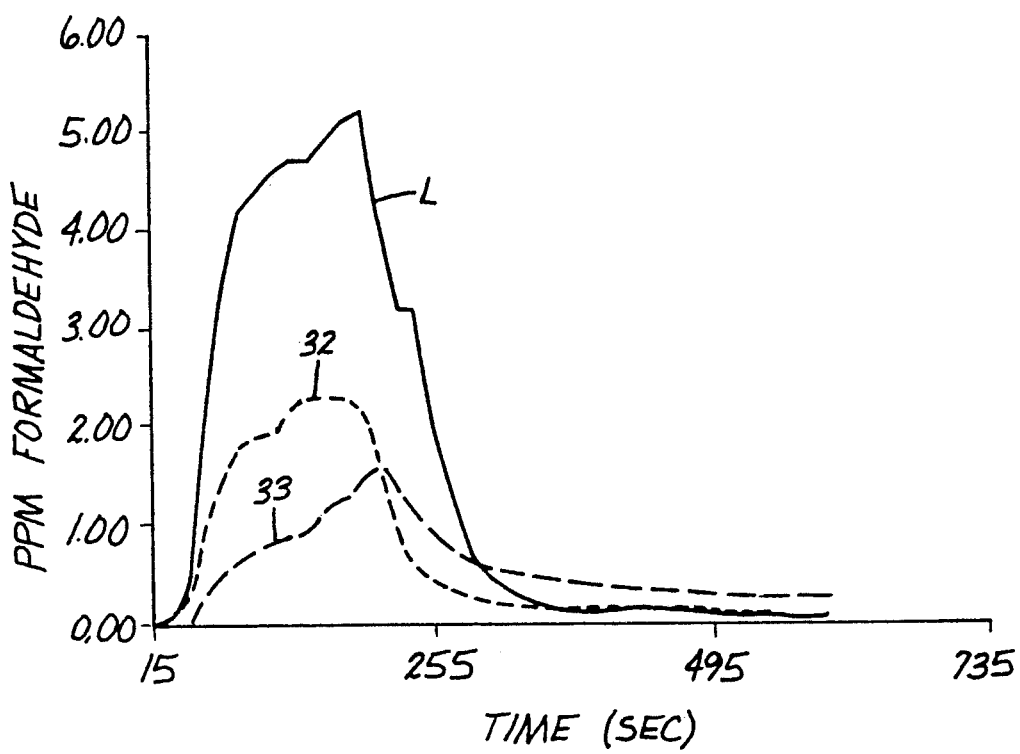
FIGS. 8-10 show graphically that the reactive diluents 2-amino-2-methyl-1-propanol (FIG. 8), β-ketobutyramide (FIG. 9), and nitromethane (FIG. 10) reduced formaldehyde emissions from coatable, thermally curable binder precursor solutions containing phenol-formaldehyde resins.
Figure 9:
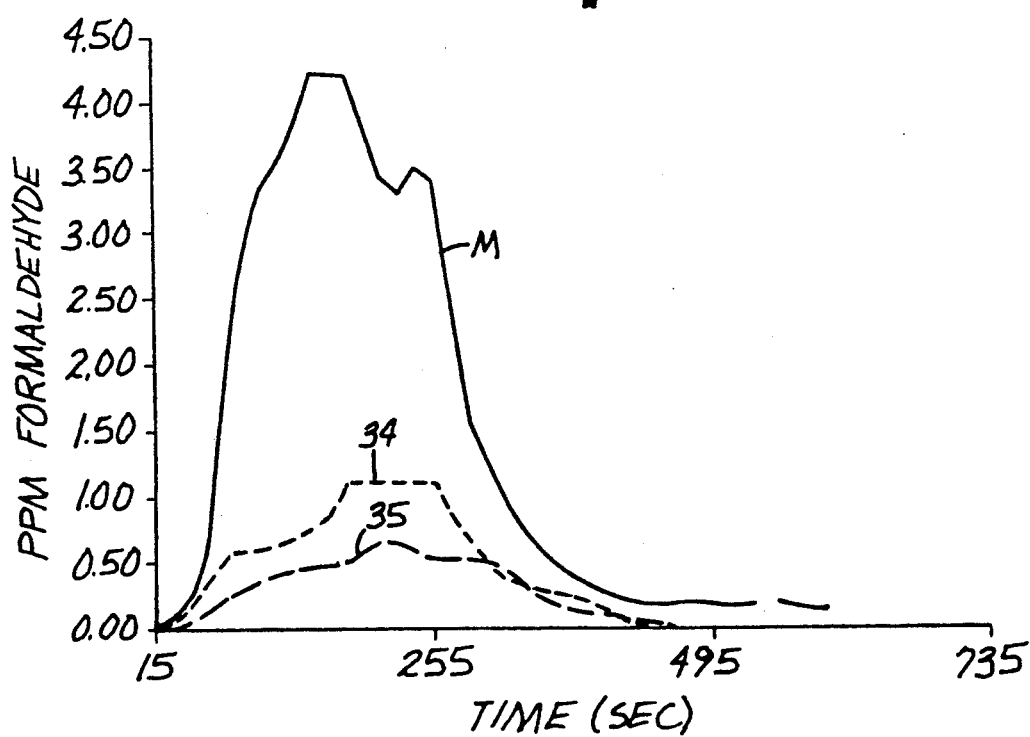
Figure 10:
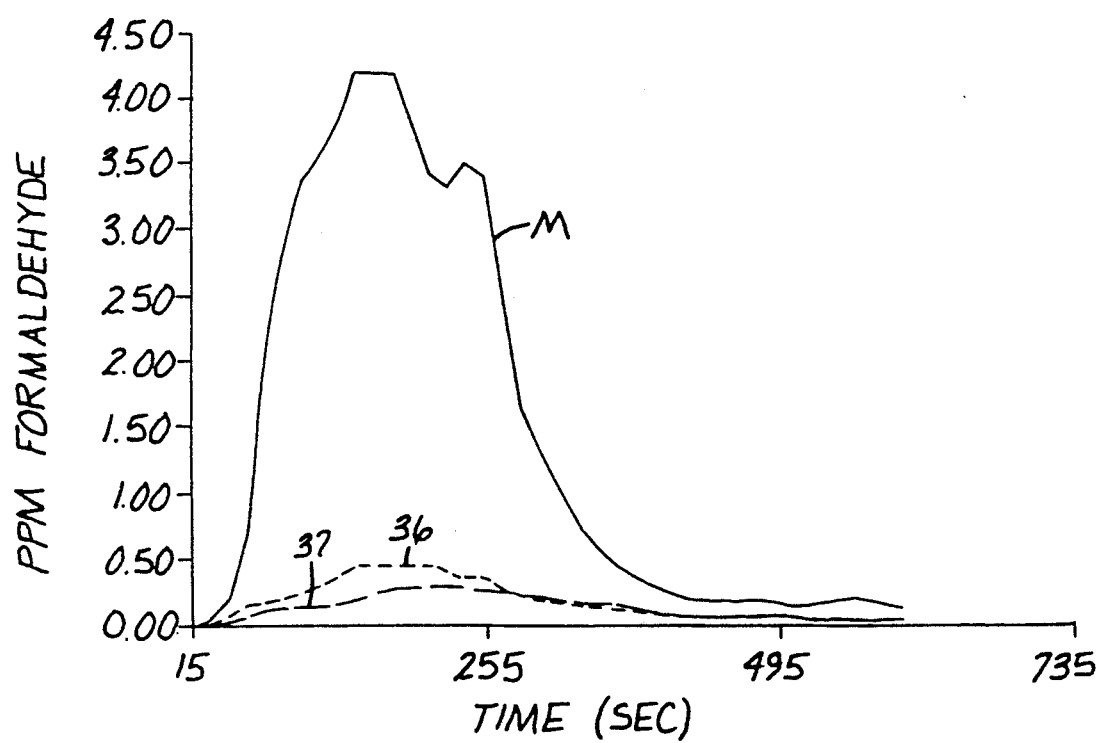

In order to determine the reduction in formaldehyde emissions from coatable, thermally curable binder precursor solutions using reactive diluents such as alkyl-substituted 2-aminoalcohols, β-ketoalkylamides and nitroalkanes, 2.0 gram samples of the compositions L and M, and Examples 32–37, as shown in Table 22, were placed in an oven at 150° C. for 13 minutes. Using the formaldehyde detector known under the trade name "Interscan" Model #1160 as in Examples G–I and 16–21 above, the relative formaldehyde release for the compositions of Examples L and M and 32–37 were determined by summing together the areas under the curves at 15 second intervals to obtain the total area under each curve, multiplying that sum by the total time elapsed, and dividing by the value obtained for the control. The relative formaldehyde releases are tabulated in Table 23. FIGS. 8–10 show graphically that increasing amounts of 2-amino-2-methyl-1-propanol (AMP, FIG. 8), β-ketobutyramide (BKB, FIG. 9), and nitromethane (NM, FIG. 10) reduced formaldehyde emission significantly compared with solutions not having these reactive diluents.

TABLE 22

| Example Designation | Phenolic Resin, Parts (75% Solids)* | Reactive Diluent, parts | Alkaline Catalyst as 50% NaOH, parts |
|---|---|---|---|
| L | 100 | 0 | 0 |
| M | 100 | 0 | 0 |
| 32 | 100 | 3 (AMP) | 1.6 |
| 33 | 100 | 6 (AMP) | 1.6 |
| 34 | 100 | 5 (BKB) | 0 |
| 35 | 100 | 7.5 (BKB) | 0 |
| 36 | 100 | 5.0 (NM) | 0 |
| 37 | 100 | 7.5 (NM) | 0 |

*same resin as used in Examples G-I and 16-21

TABLE 23

| Example Designation | Relative Formaldehyde Emissions |
|---|---|
| Comparative Example L | 100 |
| Comparative Example M | 100 |
| Example 32 | 42.62 |
| Example 33 | 37.68 |
| Example 34 | 27.0 |
| Example 35 | 16.1 |
| Example 36 | 13.1 |
| Example 37 | 9.1 |

EXAMPLES 38–43 AND COMPARATIVE EXAMPLES N, O AND P

Comparative Examples N, O and P

Comparative Example N was a microfine coated abrasive disc available under the trade designations "Imperial" "Wetordry" 1200 414Q, from Minnesota Mining and Manufacturing Company, St. Paul, Minn.

Comparative Example O was a coated abrasive disc available under the trade designation "Nikken" Grade CC 200-Cw, from Nihonkenshi Company, Ltd., Japan.

Comparative Example P had make and size resins listed in Table 25, and had a paper backing.

EXAMPLES 38–43

Grade 1200 silicon carbide paper-backed abrasives were prepared in the laboratory to evaluate blends of resole phenolic resin and the reactive diluent known under the trade designation "Jeffamin" as make and size resins versus standard epoxy resins. A construction with a monolayer of mineral was used for all experimental lots of grade 1200 silicon carbide abrasive grains. These lots were compared to Comparative Examples N and O. Three blends of resole phenolic/reactive diluent make and size resins were evaluated. The compositions of these blends are shown in Table 24. In making the resins of Table 24, some water was added to the phenolic resin prior to addition of the reactive diluent, with an additional amount of water added to adjust solids content. No external heating was used.

These blends were employed to make the examples specified in Table 25. The Comparative Resins D and E were adjusted to the desired percent solids using the solvent known under the trade designation "Aromatic 100". The resole phenolic resins modified by the reactive diluent were adjusted to the desired percent solids using tap water only. All lots were tested using the Wet Schiefer Test on acrylic discs. The results are shown in Table 26, along with test data for Comparative Examples A and B.

TABLE 24

| Component | Experimental Resin A (make) | Experimental Resin B (make & size) | Experimental Resin C (size) | Comparative Resin D | Comparative Resin E |
|---|---|---|---|---|---|
| resole phenolic resin | 54% | 64% | 74% | | |
| Jeffamine D-230 Reactive Diluent | 35% | 24% | 10% | | |
| Jeffamine EDR-148 Reactive Diluent | 9% | 10% | 14% | | |
| A-1100 Silane | 1% | 1% | 1% | | |
| Silwet L-7604 | 0.5% | 0.5% | 0.5% | | |
| Interwet | 0.5% | 0.5% | 0.5% | | |
| water | to 45% solids | to 45% (make) or 48% (size) solids | to 48% solids | | |
| Epon 871 epoxy resin | | | | 44.8% | |
| Versamid 125 | | | | 19.2% | 35% |
| Modaflow | | | | 0.04% | 0.05% |
| Aromatic 100 | | | | 35.96% | 29.95% |
| Epon 828 epoxy resin | | | | | 35% |

TABLE 25

| Example | Make Adhesive (% solids) | Make Weight (g/m²) | Mineral | Mineral Weight (g/m²) | Size Adhesive | Size Weight (g/m²) |
|---|---|---|---|---|---|---|
| P | Comparative Resin D (60%) | 3.3–3.8 | Grade 1200 SiC | 12.6–16.7 | Comparative Resin E(68%) | 16.7–20.9 |
| 38 | Comparative Resin D (60%) | 3.3–3.8 | Grade 1200 SiC | 12.6–16.7 | Comparative Resin B(48%) | 25.1–29.3 |
| 39 | Comparative Resin D (60%) | 3.3–3.8 | Grade 1200 SiC | 12.6–16.7 | Comparative Resin C(48%) | 25.1–29.3 |
| 40 | Experimental Resin A (45%) | 4.6–5.7 | Grade 1200 SiC | 12.6–16.7 | Comparative Resin B(48%) | 25.1–29.3 |
| 41 | Experimental Resin A (45%) | 4.6–5.7 | Grade 1200 SiC | 12.6–16.7 | Comparative Resin C(48%) | 25.1–29.3 |
| 42 | Experimental Resin B (45%) | 4.6–5.7 | Grade 1200 SiC | 12.6–16.7 | Comparative Resin B(48%) | 25.1–29.3 |
| 43 | Experimental Resin B (45%) | 4.6–5.7 | Grade 1200 SiC | 12.6–16.7 | Comparative Resin C(48%) | 25.1–29.3 |

TABLE 26

| | Cumulative Cut (grams) | | | | |
|---|---|---|---|---|---|
| Example | Cut After 500 cycles | Cut After 1000 cycles | Cut After 1500 cycles | Cut After 2000 cycles | Cut after 2500 cycles |
| N | 0.48 | 0.80 | 0.99 | 1.14 | 1.23 |
| O | 1.03 | 1.91 | 2.67 | 3.30 | 3.86 |
| P | 0.69 | 1.15 | 1.49 | 1.74 | 1.91 |
| 38 | 1.04 | 1.96 | 2.83 | 3.60 | 4.31 |
| 39 | 1.04 | 1.97 | 2.82 | 3.61 | 4.34 |
| 40 | 1.15 | 2.20 | 3.18 | 4.09 | 4.94 |
| 41 | 1.16 | 2.20 | 3.18 | 4.07 | 4.91 |
| 42 | 1.10 | 2.10 | 3.00 | 3.80 | 4.70 |
| 43 | 1.19 | 2.27 | 3.26 | 4.20 | 5.09 |

Following the initial Schiefer Cut testing, samples from the experimental and control examples were soaked in water for 20 hours at room temperature and retested for cut and finish. The results are shown in Table 27.

Table 27

| Example | 500-cycle finish ($R_{tm}$) | 2500-cycle Cut (grams) |
|---|---|---|
| N | 26 | 1.23 |
| O | 37 | 3.86 |
| P | 28 | 1.91 |
| 38 | 46 | 4.31 |
| 39 | 48 | 4.34 |
| 40 | 50 | 4.94 |
| 42 | 47 | 4.70 |
| 43 | 55 | 5.09 |

EXAMPLES 44–47

Examples 44 through 47 demonstrate the usefulness of the present invention in the preparation of Grade P-400 Al₂O₃ paper-backed abrasive sheet. Resin compositions are shown in Table 28 where again the reactive diluent was added after some of the water was added to the phenolic resin. The abrasive sheets 44–47 had construction as described in Table 29. Cumulative Schiefer Cut for these examples are shown in Table 30. Consistently improved cut of the abrasive of examples containing the reactive diluent is apparent.

TABLE 28

| Component | Comparative Resin F | Comparative Resin G | Experimental Resin H | Experimental Resin I |
|---|---|---|---|---|
| Epon 828 epoxy resin | 46.2% | | | |
| Resole Phenolic Resin (75% solids) | | 72.63% | 50% | 92% |
| DGMA | | 8.16% | | |

TABLE 28-continued

| Component | Comparative Resin F | Comparative Resin G | Experimental Resin H | Experimental Resin I |
|---|---|---|---|---|
| Versacure 125 (85% solids in aromatic 100) | 23.3% | | | |
| Interwet ethyl cellosolve | | 0.82% 9.19% | | |
| Modaflow | 0.05% | | | |
| Aromatic 100 | 30.45% (to 68% solids) | | | |
| Water | | 9.20% | to 60% solids 50% | to 56% solids 8% |
| Jeffamine ED600 | | | | |
| Silwet L-7604 | | | 0.25% | 0.25% |
| Interwet | | | 0.25% | 0.25% |

TABLE 29

| Example | Make Adhesive (% Solids) | Make Weight g/m² | Mineral Weight g/m² | Size Adhesive (% Solids) | Size Weight g/m² |
|---|---|---|---|---|---|
| 44 | Resin F (68%) | 9.2 | 33.5 | Resin G (59%) | 39.8 |
| 45 | Resin F (68%) | 9.2 | 33.5 | Resin I (56%) | 41.9 |
| 46 | Resin H (60%) | 10.5 | 33.5 | Resin G (59%) | 36.5 |
| 47 | Resin H (60%) | 10.5 | 33.5 | Resin I (56%) | 39.0 |

TABLE 30

| Example | Cut after 500 Cycles, g. | Cut After 1000 cycles, g. | Cut after 5500 cycles, g. | Cut after 10000 cycles, g |
|---|---|---|---|---|
| 44 | 1.695 | 3.133 | 10.747 | 12.787 |
| 45 | 1.477 | 2.835 | 11.728 | 17.405 |
| 46 | 1.983 | 3.728 | 11.763 | 13.716 |
| 47 | 1.666 | 3.250 | 11.999 | 15.722 |

COMPARATIVE EXAMPLE Q AND EXAMPLE 48

Comparative Example Q and Example 48 illustrate the making of a coated abrasive of the invention comprising a resole phenolic resin, an ethylenically unsaturated monomer, and a reactive diluent.

A coated abrasive was made having an "A" weight paper backing and utilizing grade 1200 silicon carbide abrasive grains. Comparative Example Q was made with Comparative Resin D (Table 24.) for the make resin and Comparative Resin E (Table 24.) for the size resin. Make and size resins for Example 48 are shown in Table 31. Some of the water was added to the phenolic resin prior to the addition of the reactive diluent. No external heating was applied.

TABLE 31

| Component | Make Resin for Example 48 | Size Resin for Example 48 |
|---|---|---|
| resole phenolic resin | 58% | 64% |
| PETA | 24% | |
| DGMA | 11.3% | |
| Irgacure 651 | 1.5% | |
| Interwet | 2.0% | 0.5% |
| Jeffamine D230 | | 24% |
| Jeffamine ED148 | | 10% |
| Silwet L7604 | | 0.5% |
| water | to 180 centipoise (68% solids) | to 50 centipoise (60% solids) |

After allowing the resins to reach 25° C., the viscosity of the resins was measured by using a Brookfield viscometer, number 2 spindle at 60 rpm, and a 25° C. for the make resin, 30° C. for the size resin. The various coating weights are shown in Table 32. The make coating was then applied to the paper backing. For Example 48 the structure was exposed to a 300 watt/inch UV lamp for about 0.5 seconds to effect a partial cure. Silicon carbide abrasive grains were then electrostatically coated onto the make coating for Example 48 and Comparative Example Q, and the structures were heated to 115° C. for 30 minutes to effect a partial cure of the make coatings. The size coating was then applied to each and the resulting compositions heated to 115° C. for an additional 70 minutes to complete the cure. The resulting coated abrasive articles were tested using the Wet Schiefer test for cumulative cut. The results comparing these examples with Comparative Example N and Comparative Example O are presented in Table 33.

TABLE 32

| Example | Make weight, g/m² | Mineral weight, g/m² | Size weight, g/m² |
|---|---|---|---|
| Comparative Example Q | 3.8 | 12.6 | 16.8 |
| 48 | 8.4 | 12.6 | 12.6tz,1/32 |

TABLE 33

| | Scheifer Cut | | | | |
|---|---|---|---|---|---|
| Example | Cumulative cut in 500 cycles, g | Cumulative cut in 1000 cycles, g | Cumulative cut in 1500 cycles, g | Cumulative cut in 2000 cycles, g | Cumulative cut in 2500 cycles, g. |
| Comparative Example N | 0.39 | 0.68 | 0.88 | 1.00 | 1.10 |
| Comparative Example O | 0.90 | 1.75 | 2.40 | 3.02 | 3.58 |
| Comparative Example P | 0.70 | 1.15 | 1.45 | 1.75 | 1.85 |
| 48 | 1.06 | 2.17 | 3.13 | 4.00 | 4.56 |

This work provided evidence that abrasive articles made with coatable, thermally curable binder precursor solutions with reduced formaldehyde emissions can perform as well as or better than previously known abrasives. Although the above examples are intended to be representative of the invention, they are not intended to limit the scope of the appended claims.

What is claimed is:

1. A coatable, thermally curable binder precursor solution comprising:

(a) a 30–95% solids solution of a thermally curable resin having a plurality of pendant methylol groups, the balance of the solution comprising water; and (b) a reactive diluent, wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups or with said aldehyde, and wherein said reactive diluent is selected from the group consisting of A) compounds selected from the group consisting of compounds represented by the general formula

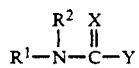

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) R$^1$ and R$^2$ or R$^1$ and R$^3$ can be linked to form a ring structure; and (iii) R$^1$, R$^2$, R$^3$, R$^4$ and R$^5$ are never all hydrogen at the same time;

B) compounds having molecular weight less than about 300 and selected from the group consisting of alkylsubstituted 2-aminoalcohols, β-ketoalkylamides, and nitro alkanes;

C) poly(oxyalkylene) amines having molecular weight ranging from about 90 to about 300; and D) poly(oxyalkylene) ureido compounds having molecular weight ranging from about 90 to about 1000.

2. A solution in accordance with claim 1 wherein said non-aldehyde is phenol and said aldehyde is formaldehyde.

3. A solution in accordance with claim 1 wherein said thermally curable resin is selected from the group consisting of phenolic resins, urea-aldehyde resins, and mixtures thereof.

4. A solution in accordance with claim 3 wherein said thermally curable resin is a phenolic resin selected from the group consisting of novolak, resole, and resolated novolak resins.

5. A solution in accordance with claim 1 wherein at least one functional group reactive with the pendant methylol groups comprises an —NH— group.

6. A solution in accordance with claim 1 wherein said reactive diluent has a molecular weight of at most about 300.

7. A solution in accordance with claim 1 wherein said reactive diluent has a molecular weight of at most about 600.

8. A solution in accordance with claim 5 wherein said reactive diluent has a molecular weight of at most about 300.

9. A solution in accordance with claim 4 wherein said phenolic resin is a resole.

10. A solution in accordance with claim 1 which further includes water in an amount sufficient to turn the resultant solution permanently milky in appearance.

11. A solution in accordance with claim 1 wherein said thermally curable resin and said reactive diluent are present in a weight ratio ranging from about 1:1 to 100:1.

12. A solution in accordance with claim 1 wherein said thermally curable resin and reactive diluent are present in a weight ratio ranging from about 2:1 to about 100:1.

13. A solution in accordance with claim 1 wherein said solution further includes abrasive particles.

14. A solution in accordance with claim 1 wherein R$^1$ is 2-hydroxyethyl, R$^2$ and R$^3$ are linked to form an ethylene bridge and R$^4$ is hydrogen.

15. A solution in accordance with claim 1 wherein X is O, Y is NR$^3$R$^4$, R$^1$ and R$^3$ are hydrogen, R$^2$ is butyl and R$^4$ is hydroxyethyl.

16. A solution in accordance with claim 1 wherein X is O, Y is NR$^3$R$^4$, R$^1$ and R$^3$ are hydrogen, R$^2$ is ethyl, and R$^4$ is butyl.

17. A solution in accordance with claim 1 wherein said reactive diluent is a poly (oxyalkylene) amine selected from the group consisting of compounds represented by the general formula

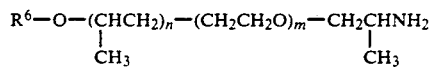

wherein R$^6$ is an alkyl group having 1 to 4 carbon atoms and n and m are integers ranging from 0 to 20.

18. A solution in accordance with claim 1 wherein said reactive diluent is a poly (oxyalkylene) amine selected from the group consisting of compounds represented by the general formula

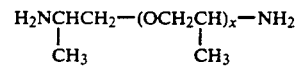

wherein x is an integer ranging from about 2 to about 20.

19. A solution in accordance with claim 1 wherein said reactive diluent is a poly (oxyalkylene) amine selected from the group consisting of compounds represented by the general formula

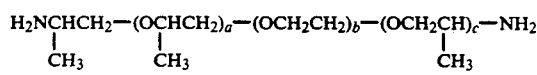

wherein a, b, and c are integers, the sum of a plus c ranges from 1 to 5, and b ranges from 0 to 20.

20. A solution in accordance with claim 1 wherein said reactive diluent is a poly (oxyalkylene) amine selected from the group consisting of compounds represented by the formula

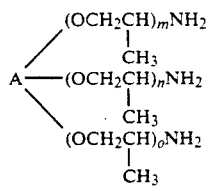

wherein m, n, and o are integers greater than zero such that the sum of m, n, and o ranges from about 5 to about 30, and wherein A is a triol initiator.

21. A cured version of the solution of claim 1.

22. An abrasive article comprising a plurality of abrasive grains dispersed and adhered within a binder, the binder formed from a coatable, thermally curable binder precursor solution comprising the reaction product of (a) a 30-95% solids solution of a thermally curable resin having a plurality of pendant methylol groups, the balance comprising water; and (b) a reactive diluent, wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and with said aldehyde, and wherein said reactive diluent is selected from the group consisting of A) compounds selected from the group consisting of compounds represented by the general formula

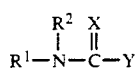

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) R$^1$ and R$^2$ or R$^1$ and R$^3$ can be linked to form a ring structure; and (iii) R$^1$, R$^2$, R$^3$, R$^4$ and R$^5$ are never all hydrogen at the same time;

B) compounds having molecular weight less than about 300 and selected from the group consisting of alkylsubstituted 2-aminoalcohols, β-ketoalkylamides, and nitro alkanes;

C) poly (oxyalkylene) amines having molecular weight ranging from about 90 to about 1000, with the proviso that if said abrasive article is a nonwoven abrasive the molecular weight of the poly (oxyalkylene) amine is less than about 300; and D) poly(oxyalkylene) ureido compounds having molecular weight ranging from about 90 to about 1000.

23. The abrasive article of claim 22 wherein said non-aldehyde is phenol and said aldehyde is formaldehyde.

24. The abrasive article of claim 22 wherein said functional group reactive with the pendant methylol groups is —NH—.

25. An abrasive article in accordance with claim 22 wherein X is O, Y=NR$^3$R$^4$, R$^1$ is 2-hydroxyethyl, R$^2$ and R$^3$ are linked to form an ethylene bridge, and R$^4$ is hydrogen.

26. An abrasive article in accordance with claim 22 wherein X is O, Y=NR$^3$R$^4$, R$^1$ and R$^3$ are hydrogen, R$^2$ is butyl and R$^4$ is hydroxyethyl.

27. An abrasive article in accordance with claim 22 wherein X is O, Y=NR$^3$R$^4$, R$^1$ and R$^3$ are hydrogen, R$^2$ is ethyl and R$^4$ is butyl.

28. An abrasive article in accordance with claim 22 wherein said reactive diluent is a poly(oxyalkylene) amine selected from the group consisting of compounds represented by the general formula

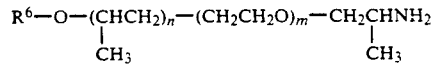

wherein R$^6$ is an alkyl group having 1 to 4 carbon atoms and n and m are integers ranging from 0 to 20.

29. An abrasive article in accordance with claim 22 wherein said reactive diluent is a poly(oxyalkylene) amine selected from the group consisting of compounds represented by the general formula

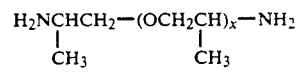

wherein x is an integer ranging from about 2 to about 20.

30. An abrasive article in accordance with claim 22 wherein said reactive diluent is a poly(oxyalkylene) amine selected from the group consisting of compounds represented by the general formula

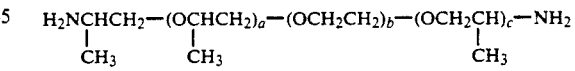

wherein a, b, and c are integers, the sum of a plus c ranges from 1 to 5, and b ranges from 0 to 20.

31. An abrasive article in accordance with claim 22 wherein said reactive diluent is a poly(oxyalkylene) amine selected from the group consisting of compounds represented by the general formula

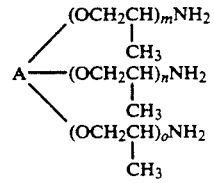

wherein m, n, and o are integers greater than zero such that the sum of m, n, and o ranges from about 5 to about 30, and wherein A is a triol initiator.

32. An abrasive article in accordance with claim 22 wherein said abrasive grains comprise flint, garnet, aluminum oxide, alumina zirconia, diamond, silicon carbide, cubic boron nitride, silicon nitride, and mixtures thereof.

33. An abrasive article in accordance with claim 22 wherein said coatable, thermally curable binder precursor solution further comprises a thermal curing catalyst.

34. An abrasive article in accordance with claim 33 wherein said thermal curing catalyst is benzoyl peroxide.

35. An abrasive article in accordance with claim 22 wherein said binder further comprises a component selected from the group consisting of fillers, coupling agents, surfactants, wetting agents, plasticizers, fibers, dyes, pigments, grinding aids, and mixtures thereof.

36. An abrasive article in accordance with claim 22 wherein said article is a bonded abrasive.

37. A coated abrasive article comprising a backing upon which an abrasive coating comprising abrasive grains and binder is attached, said binder formed from a coatable, thermally curable binder precursor solution comprising the reaction product of
   (a) a 30-95% solids solution of a thermally curable resin having a plurality of pendant methylol groups, the balance comprising water; and
   (b) a reactive diluent,
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and said aldehyde, and wherein said reactive diluent is selected from the group consisting of
   A) compounds selected from the group consisting of compounds represented by the general formula

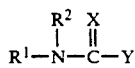

and mixtures thereof wherein $X=O$ or $S$ and $Y=-NR^3R^4$ or $-OR^5$, such that when $X=S$, $Y=NR^3R^4$, each of $R^1$, $R^2$, $R^3$, $R^4$ and $R^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
   (i) said compound contains at least one —NH and one —OH group or at least two —OH groups or at least two —NH groups;
   (ii) $R^1$ and $R^2$ or $R^1$ and $R^3$ can be linked to form a ring structure; and
   (iii) $R^1$, $R^2$, $R^3$, $R^4$ and $R^5$ are never all hydrogen at the same time;
   B) compounds having molecular weight less than about 300 and selected from the group consisting of alkylsubstituted 2-aminoalcohols, β-ketoalkylamides, and nitro alkanes;
   C) poly (oxyalkylene) amines having molecular weight ranging from about 90 to about 1000; and
   D) poly(oxyalkylene) ureido compounds having molecular weight ranging from about 90 to about 1000.

38. The coated abrasive article of claim 37 wherein said non-aldehyde is phenol and said aldehyde is formaldehyde.

39. The coated abrasive article of claim 37 wherein said thermally curable resin is a phenolic resin selected from the group consisting of resole, novolak, and resolated novolak resins.

40. The coated abrasive article of claim 37 wherein said phenolic resin is a resole.

41. The coated abrasive article of claim 37 wherein said thermally curable resin and said reactive diluent are present in a weight ratio ranging from about 1:1 to about 100:1.

42. The coated abrasive article of claim 37 wherein said abrasive grains comprise flint, garnet, aluminum oxide, alumina zirconia, diamond, silicon carbide, cubic boron nitride, silicon carbide, and mixtures thereof.

43. The coated abrasive article of claim 37 wherein said binder precursor solution further comprises a thermal curing catalyst.

44. The coated abrasive article of claim 43 wherein said thermal coating catalyst is benzoyl peroxide.

45. The coated abrasive article of claim 42 wherein said binder further comprises a component selected from the group consisting of fillers, coupling agents, surfactants, wetting agents, plasticizers, fibers, dyes, pigments, grinding aids, and mixtures thereof.

46. The coated abrasive article of claim 37 wherein X is O, $Y=NR^3R^4$, $R^1$ is 2-hydroxyethyl, $R^2$ and $R^3$ are linked to form an ethylene bridge, and $R^4$ is hydrogen.

47. The coated abrasive article of claim 37 wherein X is O, $Y=NR^3R^4$, $R^1$ and $R^3$ are hydrogen, $R^2$ is butyl and $R^4$ is hydroxyethyl.

48. The coated abrasive article of claim 37 wherein X is O, $Y=NR^3R^4$, $R^1$ and $R^3$ are hydrogen, $R^2$ is ethyl and $R^4$ is butyl.

49. The coated abrasive article of claim 37 wherein said reactive diluent is a poly (oxyalkylene) amine selected from the group consisting of compounds represented by the general formula

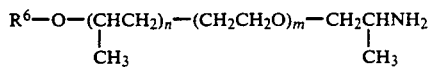

wherein $R^6$ is an alkyl group having 1 to 4 carbon atoms and n and m are integers ranging from 0 to 20.

50. The coated abrasive article of claim 37 wherein said reactive diluent is a poly (oxyalkylene) amine selected from the group consisting of compounds represented by the general formula

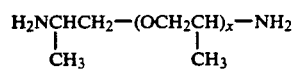

wherein x is an integer ranging from about 2 to about 20.

51. The coated abrasive article of claim 37 wherein said reactive diluent is a poly (oxyalkylene) amine selected from the group consisting of compounds represented by the general formula

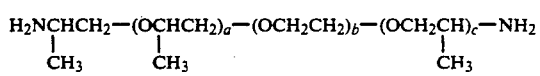

wherein a, b, and c are integers, the sum of a plus c ranges from 1 to 5, and b ranges from 0 to 20.

52. The coated abrasive article of claim 37 wherein said reactive diluent is a poly (oxyalkylene) amine selected from the group consisting of compounds represented by the general formula

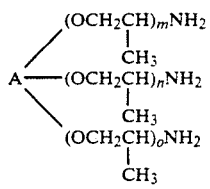

wherein m, n, and o are integers greater than zero such that the sum of m, n, and o ranges from about 5 to about 30, and wherein A is a triol initiator.

53. A coated abrasive article comprising a backing, a make coating over at least one major surface of the backing, a layer of abrasive grains over the make coating, and a size coating over the abrasive grains, wherein at least one of the make or size coatings is formed from a coatable, thermally curable binder precursor solution comprising the reaction product of
   (a) a 30–95% solids solution of a thermally curable resin having a plurality of pendant methylol groups, the balance comprising water; and
   (b) a reactive diluent,
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and with said aldehyde, and wherein said reactive diluent is selected from the group consisting of
   A) compounds selected from the group consisting of compounds represented by the general formula

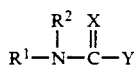

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
   (i) said compound contains at least one —NH and one —OH group or at least two —OH groups or at least two —NH groups;
   (ii) R$^1$ and R$^2$ or R$^1$ and R$^3$ can be linked to form a ring structure; and
   (iii) R$^1$, R$^2$, R$^3$, R$^4$ and R$^5$ are never all hydrogen at the same time;
   B) compounds having molecular weight less than about 300 and selected from the group consisting of alkylsubstituted 2-aminoalcohols, β-ketoalkylamides, and nitro alkanes;
   C) poly (oxyalkylene) amines having molecular weight ranging from about 90 to about 1000; and
   D) poly(oxyalkylene) ureido compounds having molecular weight ranging from about 90 to about 1000.

54. A coated abrasive article comprising a backing, a make coating over at least one major surface of the backing, a layer of abrasive grains over the make coating, and a size coating, over the abrasive grains, wherein said backing has at least one of a saturant coating, a presize coating, or a backsize coating, wherein at least one of said saturant coating, said presize coating, or said backsize coating is formed from a coatable, thermally curable binder precursor solution comprising the reaction product of
   (a) a 30–95% solids solution of a thermally curable resin having a plurality of pendant methylol groups, the balance comprising water; and
   (b) a reactive diluent,
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and with said aldehyde, and wherein said reactive diluent is selected from the group consisting of
   A) compounds selected from the group consisting of compounds represented by the general formula $$R^1-\underset{\underset{R^2}{|}}{N}-\underset{\underset{X}{\|}}{C}-Y$$

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
   (i) said compound contains at least one —NH and one —OH group or at least two —OH groups or at least two —NH groups;
   (ii) R$^1$ and R$^2$ or R$^1$ and R$^3$ can be linked to form a ring structure; and
   (iii) R$^1$, R$^2$, R$^3$, R$^4$ and R$^5$ are never all hydrogen at the same time;
   B) compounds having molecular weight less than about 300 and selected from the group consisting of alkylsubstituted 2-aminoalcohols, β-ketoalkylamides, and nitro alkanes;
   C) poly(oxyalkylene) amines having molecular weight ranging from about 90 to about 1000; and
   D) poly(oxyalkylene) ureido compounds having molecular weight ranging from about 90 to about 1000.

55. A method of making nonwoven abrasive articles of the type comprising a lofty, open, fibrous mat of fibers which have on at least a portion of their surface an abrasive coating comprising abrasive grains and a binder, said method comprising:
   (a) adhering abrasive grains to the fibers of the fibrous mat with a coatable, thermally curable binder precursor solution, said solution comprising a 30–95% solids solution of a thermally curable resin having a plurality of pendant methylol groups, the balance comprising water, and reactive diluent, thus producing a coated mat, said thermally curable resin being the reaction product of a non-aldehyde and an aldehyde, the reactive diluent having at least one functional group independently reactive with the pendant methylol groups and said aldehyde, said reactive diluent being selected from the group consisting of A) compounds selected from the group consisting of compounds represented by the general formula

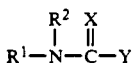

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) R$^1$ and R$^2$ or R$^1$ and R$^3$ can be linked to form a ring structure; and (iii) R$^1$, R$^2$, R$^3$, R$^4$ and R$^5$ are never all hydrogen at the same time;

B) compounds having molecular weight less than about 300 and selected from the group consisting of alkylsubstituted 2-aminoalcohols, β-ketoalkylamides, and nitro alkanes;

C) poly (oxyalkylene) amines having molecular weight ranging from about 90 to about 1000, with the proviso that if said reactive diluent is a poly(oxyalkylene) amine, its molecular weight is less than about 300; and D) poly(oxyalkylene) ureido compounds having molecular weight ranging from about 90 to about 1000; and (b) subjecting the coated mat to conditions sufficient to cure the binder precursor solution.

56. A method in accordance with claim 55 wherein said reactive diluent is a poly (oxyalkylene) amine selected from the group consisting of compounds represented by the general formula

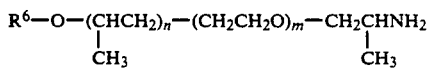

wherein R$^6$ is an alkyl group having 1 to 4 carbon atoms and n and m are integers ranging from 0 to 20.

57. A solution in accordance with claim 55 wherein said reactive diluent is a poly (oxyalkylene) amine selected from the group consisting of compounds represented by the general formula

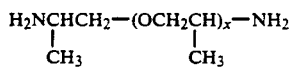

wherein x is an integer ranging from about 2 to about 20.

58. A solution in accordance with claim 55 wherein said reactive diluent is a poly (oxyalkylene) amine selected from the group consisting of compounds represented by the general formula

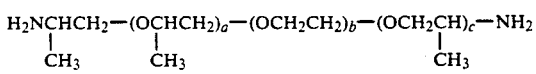

wherein a, b, and c are integers, the sum of a plus c ranges from 1 to 5, and b ranges from 0 to 20.

59. A solution in accordance with claim 55 wherein said reactive diluent is a poly (oxyalkylene) amine selected from the group consisting of compounds represented by the general formula

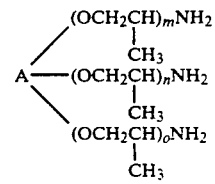

wherein m, n, and o are integers greater than zero such that the sum of m, n, and o ranges from about 5 to about 30, and wherein A is a triol initiator.

60. A method in accordance with claim 55 further comprising applying a size coating to the abrasive coated mat of step (b) and curing the size coating.

61. A method of making nonwoven abrasive articles of the type comprising a lofty, open, fibrous mat of fibers which have on at least a portion of their surface an abrasive coating comprising abrasive grains and a binder, said method comprising:

(a) combining 30–95% solids solution of a thermally curable resin, the balance comprising water, with reactive diluent to form a coatable, thermally curable binder precursor solution, at a temperature below that necessary to cure the coatable, thermally curable binder precursor solution, said reactive diluent being selected from the group consisting of A) compounds selected from the group consisting of compounds represented by the general formula

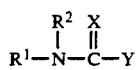

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) R$^1$ and R$^2$ or R$^1$ and R$^3$ can be linked to form a ring structure; and (iii) R$^1$, R$^2$, R$^3$, R$^4$ and R$^5$ are never all hydrogen at the same time;

B) compounds having molecular weight less than about 300 and selected from the group consisting of alkylsubstituted 2-aminoalcohols, β-ketoalkylamides, and nitro alkanes;

C) poly(oxyalkylene) amines having molecular weight ranging from about 90 to about 1000, with the proviso that if said reactive diluent is a poly(oxyalkylene) amine, its molecular weight is less than about 300; and D) poly(oxyalkylene) ureido compounds having molecular weight ranging from about 90 to about 1000;

(b) adding abrasive grains to the coatable, thermally curable binder precursor solution;

(c) coating the abrasive-filled, coatable, thermally curable binder precursor solution onto at least a portion of the fibers of a lofty, open fibrous mat; and (d) heating the abrasive coated mat of step (c) to a temperature sufficient to cure the coatable thermally curable binder precursor solution.

62. A method of making a bonded abrasive article, said method comprising:

(a) combining a coatable, thermally curable binder precursor solution comprising a 30-95% solids solution of a thermally curable resin, the balance comprising water, the resin having a plurality of pendant methylol group and made from the reaction product of a non-aldehyde and an aldehyde, and a reactive diluent with abrasive grains to form a mixture, the reactive diluent having at least one functional group independently reactive with the pendant methylol groups and said aldehyde, said reactive diluent being selected from the group consisting of A) compounds selected from the group consisting of compounds represented by the general formula

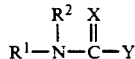

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) R¹ and R² or R¹ and R³ can be linked to form a ring structure; and (iii) R¹, R², R³, R⁴ and R⁵ are never all hydrogen at the same time;

B) compounds having molecular weight less than about 300 and selected from the group consisting of alkylsubstituted 2-aminoalcohols, β-ketoalkylamides, and nitro alkanes;

C) poly(oxyalkylene) amines having molecular weight ranging from about 90 to about 1000; and D) poly(oxyalkylene) ureido compounds having molecular weight ranging from about 90 to about 1000; and (b) subjecting the mixture of step (a) to conditions sufficient to cure the coatable, thermally curable binder precursor solution.

63. A method in accordance with claim 62 which further comprises introducing said abrasive grains, said binder precursor solution, and said reactive diluent into a mold prior to step (b).

64. A method of making a coated abrasive article, said method comprising:

(a) coating a backing with a coatable, thermally curable binder precursor solution comprising a 30-95% solid solution of a thermally curable resin, the balance comprising water, abrasive grains, and reactive diluent, the resin having a plurality of pendant methylol groups, and being the reaction product of a non-aldehyde and an aldehyde, said non-aldehyde selected from the group consisting of ureas and phenolics, wherein said reactive diluent has at least one functional group which is independently reactive with said pendant methylol groups and with said aldehydes, said reactive diluent being selected from the group consisting of A) compounds selected from the group consisting of compounds represented by the general formula

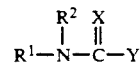

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) R¹ and R² or R¹ and R³ can be linked to form a ring structure; and (iii) R¹, R², R³, R⁴ and R⁵ are never all hydrogen at the same time;

B) compounds having molecular weight less than about 300 and selected from the group consisting of alkylsubstituted 2-aminoalcohols, β-ketoalkylamides, and nitro alkanes;

C) poly (oxyalkylene) amines having molecular weight ranging from about 90 to about 1000; and D) poly(oxyalkylene) ureido compounds having molecular weight ranging from about 90 to about 1000, thereby providing a coated backing; and (b) subjecting the coated backing of step (a) to conditions sufficient to cure the coatable, thermally curable binder precursor solution.

65. A method in accordance with claim 64 wherein prior to step (a) water is added to the binder precursor solution in an amount sufficient to turn the resultant solution permanently milky in appearance.

66. A method of making a coated abrasive article comprising the steps of:
(a) applying a first coatable, thermally curable binder precursor solution to at least one major surface of a backing to form a make coating, the coatable, thermally curable binder precursor solution comprising a thermally curable resin and reactive diluent, the resin having a plurality of pendant methylol groups, and being the reaction product of a non-aldehyde and an aldehyde, said non-aldehyde selected from the group consisting of ureas and phenolics, wherein said reactive diluent has at least one functional group which is independently reactive with said pendant methylol groups and with said aldehydes, said reactive diluent being selected from the group consisting of
A) compounds selected from the group consisting of compounds represented by the general formula

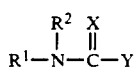

and mixtures thereof wherein $X=O$ or $S$ and $Y=-NR^3R^4$ or $-OR^5$, such that when $X=S$, $Y=NR^3R^4$, each of $R^1$, $R^2$, $R^3$, $R^4$ and $R^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one $-NH$ and one $-OH$ group or at least two $-OH$ groups or at least two $-NH$ groups;
(ii) $R^1$ and $R^2$ or $R^1$ and $R^3$ can be linked to form a ring structure; and
(iii) $R^1$, $R^2$, $R^3$, $R^4$ and $R^5$ are never all hydrogen at the same time;
B) compounds having molecular weight less than about 300 and selected from the group consisting of alkylsubstituted 2-aminoalcohols, β-ketoalkylamides, and nitro alkanes;
C) poly (oxyalkylene) amines having molecular weight ranging from about 90 to about 1000; and
D) poly(oxyalkylene) ureido compounds having molecular weight ranging from about 90 to about 1000;
(b) subjecting the make coating to conditions sufficient to partially cure the make coating;
(c) applying abrasive grains to the partially cured make coating of step (b) to form an abrasive coating;
(d) applying a second coatable, thermally curable binder precursor solution which is the same as or different than the first coatable, thermally curable binder precursor solution to form a size coating over the abrasive coating of step (c); and
(e) subjecting the structure of step (c) to a temperature sufficient to cure the first and second coatable, thermally curable binder precursor solutions.

67. A coatable, thermally curable binder precursor solution in accordance with claim 1 which further includes an ethylenically unsaturated monomer.

68. A cured version of the coatable, thermally curable binder precursor solution of claim 14.

69. An abrasive article in accordance with claim 22 wherein said coatable, thermally curable binder precursor solution includes an ethylenically unsaturated monomer.

70. The coated abrasive article of claim 36 wherein said coatable, thermally curable binder precursor solution further includes an ethylenically unsaturated monomer.

71. The method of claim 55 wherein said coatable, thermally curable binder precursor solution further includes an ethylenically unsaturated monomer.

72. The method of claim 62 wherein said coatable, thermally curable binder precursor solution further includes an ethylenically unsaturated monomer.

73. The method of claim 64 wherein said coatable, thermally curable binder precursor solution further includes an ethylenically unsaturated monomer.

74. A coatable, thermally curable binder precursor solution comprising:
(a) a 30–95% solids solution of a thermally curable resin having a plurality of pendant methylol groups, the balance of the solution comprising water; and
(b) a reactive diluent;
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups or with said aldehyde, and wherein said reactive diluent is selected from the group consisting of
A) compounds selected from the group consisting of compounds represented by the general formula

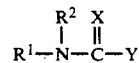

and mixtures thereof wherein $X=O$ or $S$ and $Y=-NR^3R^4$ or $-OR^5$, such that when $X=S$, $Y=NR^3R^4$, each of $R^1$, $R^2$, $R^3$, $R^4$ and $R^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one $-NH$ and one $-OH$ group or at least two $-OH$ groups or at least two $-NH$ groups;
(ii) $R^1$ and $R^2$ or $R^1$ and $R^3$ can be linked to form a ring structure; and
(iii) $R^1$, $R^2$, $R^3$, $R^4$ and $R^5$ are never all hydrogen at the same time; and
B) compounds having molecular weight less than about 300 and selected from the group consisting of alkylsubstituted 2-aminoalcohols, β-ketoalkylamides, and nitro alkanes.

75. A solution in accordance with claim 74 wherein said non-aldehyde is phenol and said aldehyde is formaldehyde.

76. A solution in accordance with claim 74 wherein said thermally curable resin is selected from the group consisting of phenolic resins, urea-aldehyde resins, and mixtures thereof.

77. A solution in accordance with claim 76 wherein said thermally curable resin is a phenolic resin selected from the group consisting of novolak, resole, and resolated novolak resins.

78. A solution in accordance with claim 74 wherein at least one functional group reactive with the pendant methylol groups comprises an —NH— group.

79. A solution in accordance with claim 77 wherein said phenolic resin is a resole.

80. A solution in accordance with claim 74 which further includes water in an amount sufficient to turn the resultant solution permanently milky in appearance.

81. A solution in accordance with claim 74 wherein said thermally curable resin and said reactive diluent are present in a weight ratio ranging from about 1:1 to 100:1.

82. A solution in accordance with claim 74 wherein said thermally curable resin and reactive diluent are present in a weight ratio ranging from about 2:1 to about 100:1.

83. A solution in accordance with claim 74 wherein said solution further includes abrasive particles.

84. A solution in accordance with claim 74 wherein $R^1$ is 2-hydroxyethyl, $R^2$ and $R^3$ are linked to form an ethylene bridge and $R^4$ is hydrogen.

85. A solution in accordance with claim 74 wherein X is O, Y is $NR^3R^4$, $R^1$ and $R^3$ are hydrogen, $R^2$ is butyl and $R^4$ is hydroxyethyl.

86. A solution in accordance with claim 74 wherein X is O, Y is $NR^3R^4$, $R^1$ and $R^3$ are hydrogen, $R^2$ is ethyl and $R^4$ is butyl.

87. A cured version of the solution of claim 1.

88. An abrasive article comprising a plurality of abrasive grains dispersed and adhered within a binder, the binder formed from a coatable, thermally curable binder precursor solution comprising the reaction product of
   (a) (a) a 30-95% solids solution of a thermally curable resin having a plurality of pendant methylol groups, the balance comprising water; and
   (b) a reactive diluent,
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and with said aldehyde, and wherein said reactive diluent is selected from the group consisting of
   A) compounds selected from the group consisting of compounds represented by the general formula

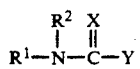

and mixtures thereof wherein X=O or S and Y=—$NR^3R^4$ or —$OR^5$, such that when X=S, Y=$NR^3R^4$, each of $R^1$, $R^2$, $R^3$, $R^4$ and $R^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) $R^1$ and $R^2$ or $R^1$ and $R^3$ can be linked to form a ring structure; and (iii) $R^1$, $R^2$, $R^3$, $R^4$ and $R^5$ are never all hydrogen at the same time; and B) compounds having molecular weight less than about 300 and selected from the group consisting of alkylsubstituted 2-aminoalcohols, β-ketoalkylamides, and nitro alkanes.

89. The abrasive article of claim 88 wherein said non-aldehyde is phenol and said aldehyde is formaldehyde.

90. The abrasive article of claim 88 wherein said functional group reactive with the pendant methylol group is —NH—.

91. The abrasive article in accordance with claim 88 wherein X is O, Y=$NR^3R^4$, $R^1$ is 2-hydroxyethyl, $R^2$ and $R^3$ are linked to form an ethylene bridge, and $R^4$ is hydrogen.

92. An abrasive article in accordance with claim 88 wherein X is O, Y=$NR^3R^4$, $R^1$ and $R^3$ are hydrogen, $R^2$ is butyl and $R^4$ is hydroxyethyl.

93. An abrasive article in accordance with claim 88 wherein X is O, Y=$NR^3R^4$, $R^1$ and $R^3$ are hydrogen, $R^2$ is ethyl and $R^4$ is butyl.

94. An abrasive article in accordance with claim 88 wherein said abrasive grains comprise flint, garnet, aluminum oxide, alumina zirconia, diamond, silicon carbide, cubic boron nitride, silicon nitride, and mixtures thereof.

95. An abrasive article in accordance with claim 88 wherein said coatable, thermally curable binder precursor solution further comprises a thermal curing catalyst.

96. An abrasive article in accordance with claim 95 wherein said thermal curing catalyst is benzoyl peroxide.

97. An abrasive article in accordance with claim 88 wherein said binder further comprises a component selected from the group consisting of fillers, coupling agents, surfactants, wetting agents, plasticizers, fibers, dyes, pigments, grinding aids, and mixtures thereof.

98. An abrasive article in accordance with claim 88 wherein said article is a bonded abrasive.

99. A coated abrasive article comprising a backing upon which an abrasive coating comprising abrasive grains and binder is attached, said binder formed from a coatable, thermally curable binder precursor solution comprising the reaction product of
   (a) a 30-95% solids solution of a thermally curable resin having a plurality of pendant methylol groups, the balance comprising water; and
   (b) a reactive diluent;
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and said aldehyde, and wherein said reactive diluent is selected from the group consisting of
   A) compounds selected from the group consisting of compounds represented by the general formula

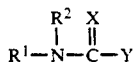

and mixtures thereof wherein X=O or S and Y=—NR$^3$R$^4$ or —OR$^5$, such that when X=S, Y=NR$^3$R$^4$, each of R$^1$R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R$^1$ and R$^2$ or R$^1$ and R$^3$ can be linked to form a ring structure; and
(iii) R$^1$, R$^2$, R$^3$, R$^4$ and R$^5$ are never all hydrogen at the same time; and
B) compounds having molecular weight less than about 300 and selected from the group consisting of alkylsubstituted 2-aminoalcohols, β-ketoalkylamides, and nitro alkanes.

100. The coated abrasive article of claim 99 wherein said non-aldehyde is phenol and said aldehyde is formaldehyde.

101. The coated abrasive article of claim 99 wherein said thermally curable resin is a phenolic resin selected from the group consisting of resole, novolak, and resolated novolak resins.

102. The coated abrasive article of claim 99 wherein said phenolic resin is a resole.

103. The coated abrasive article of claim 99 wherein said thermally curable resin and said reactive diluent are present in a weight ratio ranging from about 1:1 to about 100:1.

104. The coated abrasive article of claim 99 wherein said abrasive grains comprise flint, garnet, aluminum oxide, alumina zirconia, diamond, silicon carbide, cubic boron nitride, silicon carbide, and mixtures thereof.

105. The coated abrasive article of claim 99 wherein said binder precursor solution further comprises a thermal curing catalyst.

106. The coated abrasive article of claim 105 wherein said thermal coating catalyst is benzoyl peroxide.

107. The coated abrasive article of claim 99 wherein said binder further comprises a component selected from the group consisting of fillers, coupling agents, surfactants, wetting agents, plasticizers, fibers, dyes, pigments, grinding aids, and mixtures thereof.

108. The coated abrasive article of claim 99 wherein X is O, Y=NR$^3$R$^4$, R$^1$ is 2-hydroxyethyl, R$^2$ and R$^3$ are linked to form an ethylene bridge, and R$^4$ is hydrogen.

109. The coated abrasive article of claim 99 wherein X is O, Y=NR$^3$R$^4$, R$^1$ and R$^3$ are hydrogen, R$^2$ is butyl and R$^4$ is hydroxyethyl.

110. The coated abrasive article of claim 99 wherein X is O, Y=NR$^3$R$^4$, R$^1$ and R$^3$ are hydrogen, R$^2$ is ethyl and R$^4$ is butyl.

111. A coated abrasive article comprising a backing, a make coating over at least one major surface of the backing, a layer of abrasive grains over the make coating, and a size coating over the abrasive grains, wherein at least one of the make or size coatings is formed from a coatable, thermally curable binder precursor solution comprising the reaction product of
(a) a 30-95% solids solution of a thermally curable resin having a plurality of pendant methylol groups, the balance comprising water; and
(b) a reactive diluent,
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and with said aldehyde, and wherein said reactive diluent is selected from the group consisting of
A) compounds selected from the group consisting of compounds represented by the general formula

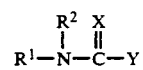

and mixtures thereof wherein X=O or S and Y=—NR$^3$R$^4$ or —OR$^5$, such that when X=S, Y=NR$^3$R$^4$, each of R$^1$, R$^2$, R$^3$, R$^4$ and R$^5$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R$^1$ and R$^2$ or R$^1$ and R$^3$ can be linked to form a ring structure; and
(iii) R$^1$, R$^2$, R$^3$, R$^4$ and R$^5$ are never all hydrogen at the same time; and
B) compounds having molecular weight less than about 300 and selected from the group consisting of alkylsubstituted 2-aminoalcohols, β-ketoalkylamides, and nitro alkanes.

112. A coated abrasive article comprising a backing, a make coating over at least one major surface of the backing, a layer of abrasive grains over the make coating, and a size coating, over the abrasive grains, wherein said backing has at least one of a saturant coating, a presize coating, or a backsize coating, wherein at least one of said saturant coating, said presize coating, or said backsize coating is formed from a coatable, thermally curable binder precursor solution comprising the reaction product of
(a) a 30-95% solids solution of a thermally curable resin having a plurality of pendant methylol groups, the balance comprising water; and
(b) a reactive diluent,
wherein said thermally curable resin is the reaction product of a non-aldehyde and an aldehyde, said non-aldehyde selected from the group consisting of ureas and phenolics, and wherein said reactive diluent has at least one functional group which is independently reactive with said pendant methylol groups and with said aldehyde, and wherein said reactive diluent is selected from the group consisting of
A) compounds selected from the group consisting of compounds represented by the general formula

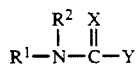

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R¹ and R² or R¹ and R³ can be linked to form a ring structure; and
(iii) R¹, R², R³, R⁴ and R⁵ are never all hydrogen at the same time; and
B) compounds having molecular weight less than about 300 and selected from the group consisting of alkylsubstituted 2-aminoalcohols, β-ketoalkylamides, and nitro alkanes.

113. A method of making nonwoven abrasive articles of the type comprising a lofty, open, fibrous mat of fibers which have on at least a portion of their surface an abrasive coating comprising abrasive grains and a binder, said method comprising:
(a) adhering abrasive grains to the fibers of the fibrous mat with a coatable, thermally curable binder precursor solution, said solution comprising a 30-95% solids solution of a thermally curable resin having a plurality of pendant methylol groups, the balance comprising water, and reactive diluent, thus producing a coated mat, said thermally curable resin being the reaction product of a non-aldehyde and an aldehyde, the reactive diluent having at least one functional group independently reactive with the pendant methylol groups and said aldehyde, said reactive diluent being selected from the group consisting of
A) compounds selected from the group consisting of compounds represented by the general formula

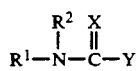

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R¹ and R² or R¹ and R³ can be linked to form a ring structure; and
(iii) R¹, R², R³, R⁴ and R⁵ are never all hydrogen at the same time; and
B) compounds having molecular weight less than about 300 and selected from the group consisting of alkylsubstituted 2-aminoalcohols, β-ketoalkylamides, and nitro alkanes, and
(b) subjecting the coated mat to conditions sufficient to cure the binder precursor solution.

114. A method in accordance with claim 113 further comprising applying a size coating to the abrasive coated mat of step (b) and curing the size coating.

115. A method of making nonwoven abrasive articles of the type comprising a lofty, open, fibrous mat of fibers which have on at least a portion of their surface an abrasive coating comprising abrasive grains and a binder, said method comprising:
(a) combining 30-95% solids solution of a thermally curable resin, the balance comprising water, with reactive diluent to form a coatable, thermally curable binder precursor solution, at a temperature below that necessary to cure the coatable, thermally curable binder precursor solution, said reactive diluent being selected from the group consisting of
A) compounds selected from the group consisting of compounds represented by the general formula

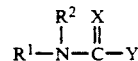

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R¹ and R² or R¹ and R³ can be linked to form a ring structure; and
(iii) R¹, R², R³, R⁴ and R⁵ are never all hydrogen at the same time; and
B) compounds having molecular weight less than about 300 and selected from the group consisting of alkylsubstituted 2-aminoalcohols, β-ketoalkylamides, and nitro alkanes;
(b) adding abrasive grains to the coatable, thermally curable binder precursor solution;
(c) coating the abrasive-filled, coatable, thermally curable binder precursor solution onto at least a portion of the fibers of a lofty, open fibrous mat; and
(d) heating the abrasive coated mat of step (c) to a temperature sufficient to cure the coatable thermally curable binder precursor solution.

116. A method of making a bonded abrasive article, said method comprising:
combining a coatable, thermally curable binder precursor solution comprising a 30-95% solids solution of a thermally curable resin, the balance comprising water, the resin having a plurality of pendant methylol groups and made from the reaction product of a non-aldehyde and an aldehyde, and a reactive diluent with abrasive grains to form a mixture, the reactive diluent having at least one functional group independently reactive with the pendant methylol groups and said aldehyde, said reactive diluent being selected from the group consisting of A) compounds selected from the group consisting of compounds represented by the general formula

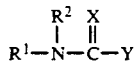

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R¹ and R² or R¹ and R³ can be linked to form a ring structure; and
(iii) R¹, R², R³, R⁴ and R⁵ are never all hydrogen at the same time; and B) compounds having molecular weight less than about 300 and selected from the group consisting of alkylsubstituted 2-aminoalcohols, β-ketoalkylamides, and nitro alkanes;

(b) subjecting the mixture of step (a) to conditions sufficient to cure the coatable, thermally curable binder precursor solution.

117. A method in accordance with claim 116 which further comprises introducing said abrasive grains, said binder precursor solution, and said reactive diluent into a mold prior to step (b).

118. A method of making a coated abrasive article, said method comprising:
(a) coating a backing with a coatable, thermally curable binder precursor solution comprising a 30-95% solid solution of a thermally curable resin, the balance comprising water, abrasive grains, and reactive diluent, the resin having a plurality of pendant methylol groups, and being the reaction product of a non-aldehyde and an aldehyde, said non-aldehyde selected from the group consisting of ureas and phenolics, wherein said reactive diluent has at least one functional group which is independently reactive with said pendant methylol groups and with said aldehydes, said reactive diluent being selected from the group consisting of A) compounds selected from the group consisting of compounds represented by the general formula

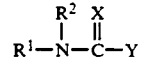

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R¹ and R² or R¹ and R³ can be linked to form a ring structure; and
(iii) R¹, R², R³, R⁴ and R⁵ are never all hydrogen at the same time; and B) compounds having molecular weight less than about 300 and selected from the group consisting of alkylsubstituted 2-aminoalcohols, β-ketoalkylamides, and nitro alkanes;
thereby providing a coated backing; and
(b) subjecting the coated backing of step (a) to conditions sufficient to cure the coatable, thermally curable binder precursor solution.

119. A method in accordance with claim 118 wherein prior to step (a) water is added to the binder precursor solution in an amount sufficient to turn the resultant solution permanently milky in appearance.

120. A method of making a coated abrasive article comprising the steps of:
(a) applying a first coatable, thermally curable binder precursor solution to at least one major surface of a backing to form a make coating, the coatable, thermally curable binder precursor solution comprising a thermally curable resin and reactive diluent, the resin having a plurality of pendant methylol groups, and being the reaction product of a non-aldehyde and an aldehyde, said non-aldehyde selected from the group consisting of ureas and phenolics, wherein said reactive diluent has at least one functional group which is independently reactive with said pendant methylol groups and with said aldehydes, said reactive diluent being selected from the group consisting of A) compounds selected from the group consisting of compounds represented by the general formula

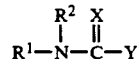

and mixtures thereof wherein X=O or S and Y=—NR³R⁴ or —OR⁵, such that when X=S, Y=NR³R⁴, each of R¹, R², R³, R⁴ and R⁵ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:
(i) said compound contains at least one —NH and one —OH group or at least two —OH groups or at least two —NH groups;
(ii) R¹ and R² or R¹ and R³ can be linked to form a ring structure; and (iii) $R^1$, $R^2$, $R^3$, $R^4$ and $R^5$ are never all hydrogen at the same time; and B) compounds having molecular weight less than about 300 and selected from the group consisting of alkylsubstituted 2-aminoalcohols, β-ketoalkylamides, and nitro alkanes;

(b) subjecting the make coating to conditions sufficient to partially cure the make coating;

(c) applying abrasive grains to the partially cured make coating of step (b) to form an abrasive coating;

(d) applying a second coatable, thermally curable binder precursor solution which is the same as or different than the first coatable, thermally curable binder precursor solution to form a size coating over the abrasive coating of step (c); and (e) subjecting the structure of step (c) to a temperature sufficient to cure the first and second coatable, thermally curable binder precursor solutions.

121. A coatable, thermally curable binder precursor solution in accordance with claim 74 which further includes an ethylenically unsaturated monomer.

122. A cured version of the coatable, thermally curable binder precursor solution of claim 84.

123. An abrasive article in accordance with claim 88 wherein said coatable, thermally curable binder precursor solution includes an ethylenically unsaturated monomer.

124. The coated abrasive article of claim 98 wherein said coatable, thermally curable binder precursor solution further includes an ethylenically unsaturated monomer.

125. The method of claim 113 wherein said coatable, thermally curable binder precursor solution further includes an ethylenically unsaturated monomer.

126. The method of claim 116 wherein said coatable, thermally curable binder precursor solution further includes an ethylenically unsaturated monomer.

127. The method of claim 118 wherein said coatable, thermally curable binder precursor solution further includes an ethylenically unsaturated monomer.

* * * * *

UNITED STATES PATENT AND TRADEMARK OFFICE
CERTIFICATE OF CORRECTION

PATENT NO. : 5,178,646

DATED : January 12, 1993

INVENTOR(S) : Loren L. Barber, Jr., Todd J. Christianson and Jay B. Preson

It is certified that error appears in the above-identified patent and that said Letters Patent is hereby corrected as shown below:

On the title page:
[56] Other References: Other Publications: "*American Society*" should read -- *American Chemical Society* --

| | |
|---|---|
| Col. 3, line 60 | "e al." should read -- et al. -- |
| Col. 9, line 19 | "phenolaldehyde" should read -- phenol-aldehyde -- |
| Col. 10, line 63 | "(N,N'-bis(2 hydroxyethyl)urea)" should read -- (N,N'-bis(2-hydroxyethyl)urea) -- |
| Col. 12, lines 45-46 | delete from "trade designation" to end of paragraph |
| Col. 16, line 65 | "acetaldehyd,," should read -- acetaldehyde, -- |
| Col. 30 Table 15 | "Formaldehyde," should read -- Formaldehyde 37%* -- |
| Col. 31, line 21 | "7.8" should read -- 17.8 -- |
| Col. 35, Table 25 | for Examples 38-43 under the column heading "Size Adhesive" the word "Comparative" should be -- Experimental -- |

UNITED STATES PATENT AND TRADEMARK OFFICE
CERTIFICATE OF CORRECTION

PATENT NO. : 5,178,646
DATED : January 12, 1993
INVENTOR(S) : Loren L. Barber, Jr., Todd J. Christianson and Jay B. Preson It is certified that error appears in the above-identified patent and that said Letters Patent is hereby corrected as shown below:

| | | |
|---|---|---|
| Col. 35, Table 27 | Example 41 is missing. It should read -- 41    50    4.94 -- | |
| Col. 38, Table 32 | "12.6tz,1/32" should read -- 12.6 -- | |
| Col. 38, Table 33 | In first and second column "Cumultive" should read -- Cumulative -- | |
| Col. 49, line 29 | "group" should read -- groups -- | |
| Col. 53, line 39 | "(a)(a)" should read -- (a) -- | |

Signed and Sealed this

Twenty-fifth Day of January, 1994

Attest:

*Attesting Officer*

BRUCE LEHMAN

*Commissioner of Patents and Trademarks*